(12) United States Patent
Schwab et al.

(10) Patent No.: US 12,502,161 B2
(45) Date of Patent: Dec. 23, 2025

(54) RADIOLOGICALLY NAVIGATED INTRA-OPERATIVE SPINAL GUIDANCE SYSTEM

(71) Applicant: NEW YORK SOCIETY FOR THE RELIEF OF THE RUPTURED AND CRIPPLED, MAINTAINING THE HOSPITAL FOR SPECIAL SURGERY, New York, NY (US)

(72) Inventors: Frank Schwab, Oldwick, NJ (US); Frank Kosarek, Charlotte, NC (US); Virginie Lafage, New York, NY (US)

(73) Assignee: NEW YORK SOCIETY FOR THE RELIEF OF THE RUPTURED AND CRIPPLED, MAINTAINING THE HOSPITAL FOR SPECIAL SURGERY, New York, NY (US)

( * ) Notice: Subject to any disclaimer, the term of this patent is extended or adjusted under 35 U.S.C. 154(b) by 90 days.

(21) Appl. No.: 18/278,670

(22) PCT Filed: Mar. 4, 2022

(86) PCT No.: PCT/US2022/018959
§ 371 (c)(1),
(2) Date: Aug. 24, 2023

(87) PCT Pub. No.: WO2022/187659
PCT Pub. Date: Sep. 9, 2022

(65) Prior Publication Data
US 2024/0138818 A1    May 2, 2024

Related U.S. Application Data

(60) Provisional application No. 63/157,483, filed on Mar. 5, 2021.

(51) Int. Cl.
*A61B 8/08* (2006.01)
*A61B 6/00* (2024.01)
(Continued)

(52) U.S. Cl.
CPC ............ *A61B 8/5261* (2013.01); *A61B 6/032* (2013.01); *A61B 6/466* (2013.01); *A61B 6/5247* (2013.01);
(Continued)

(58) Field of Classification Search
CPC ...... A61B 2034/105; A61B 2034/2048; A61B 2034/2051; A61B 2034/2055;
(Continued)

(56) References Cited

U.S. PATENT DOCUMENTS 6,106,464 A    8/2000  Bass et al.
6,556,696 B1   4/2003  Summers et al.
(Continued)

FOREIGN PATENT DOCUMENTS

CN      102999902      12/2016
EP        3395281      10/2018
WO   WO 2020/239842 A1  12/2020

OTHER PUBLICATIONS

El-Hariri et al., "Augmented reality visualisation for orthopaedic surgical guidance with pre- and intra-operative multimodal image data fusion," Healthcare Technology Letters, Aug. 2018, 5(5)189-193.
(Continued)

*Primary Examiner* — Michael T Rozanski
(74) *Attorney, Agent, or Firm* — Fish & Richardson P.C.

(57) ABSTRACT

A method includes accessing ultrasound data encoding 3D surface information of one or more body structures in a region, extracting a first 3D surface representation of the one or more body structures based on the ultrasound data,
(Continued)

accessing non-ultrasound imaging data obtained from performing non-ultrasound imaging of the region; extracting a second 3D surface representation of the one or more body structures based on the non-ultrasound imaging data; identifying, using a deep learning algorithm, one or more regions of interest (ROI)s from the first 3D surface representation such that when aligning the first 3D surface representation and the second 3D surface representation over the one or more regions of interest (ROI)s, a spatial transformation is determined; and based on applying the spatial transformation, generating an overlay of the 3D surface anatomical information from the non-ultrasound imaging data on the 3D surface information from the ultrasound data.

35 Claims, 13 Drawing Sheets

(51) Int. Cl.

| | | |
|---|---|---|
| *A61B 6/03* | (2006.01) | |
| *A61B 6/46* | (2024.01) | |
| *A61B 8/00* | (2006.01) | |
| *A61B 34/20* | (2016.01) | |
| *A61B 90/00* | (2016.01) | |

(52) U.S. Cl.
CPC ............ *A61B 8/085* (2013.01); *A61B 8/4245* (2013.01); *A61B 8/5253* (2013.01); *A61B 90/36* (2016.02); *A61B 2034/2048* (2016.02); *A61B 2034/2051* (2016.02); *A61B 2034/2055* (2016.02); *A61B 2090/378* (2016.02)

(58) Field of Classification Search
CPC ...... A61B 2034/2063; A61B 2090/378; A61B 34/20; A61B 6/032; A61B 6/466; A61B 6/5247; A61B 8/085; A61B 8/4245; A61B 8/5238; A61B 8/5253; A61B 8/5261; A61B 90/36; A61B 90/37; G06N 3/0464; G06N 3/09; G06T 2207/10081; G06T 2207/10136; G06T 2207/30012; G06T 7/33; G16H 20/40; G16H 30/20; G16H 30/40; G16H 50/20; G16H 50/50; G16H 50/70
See application file for complete search history.

(56) References Cited

U.S. PATENT DOCUMENTS

| | | |
|---|---|---|
| 6,725,082 B2 | 4/2004 | Sati et al. |
| 7,072,705 B2 | 7/2006 | Miga et al. |
| 7,664,542 B2 | 2/2010 | Boese et al. |
| 8,031,922 B2 | 10/2011 | Haimerl et al. |
| 8,126,239 B2 | 2/2012 | Sun et al. |
| 8,162,955 B2 | 4/2012 | Drumm et al. |
| 9,005,211 B2 | 4/2015 | Brundobler et al. |
| 9,173,715 B2 | 11/2015 | Baumgartner |
| 9,757,202 B2 | 9/2017 | Chen et al. |
| 9,757,245 B2 | 9/2017 | O'Neil et al. |
| 9,761,014 B2 | 9/2017 | Oktay et al. |
| 9,799,114 B2 | 10/2017 | Piron et al. |
| 9,833,291 B2 | 12/2017 | Baumgartner |
| 9,875,540 B2 | 1/2018 | Blumhofer et al. |
| 9,916,422 B2 | 3/2018 | Haimerl |
| 9,993,177 B2 | 6/2018 | Chien et al. |
| 10,074,177 B2 | 9/2018 | Piron et al. |
| 10,154,239 B2 | 12/2018 | Casas |
| 10,194,131 B2 | 1/2019 | Casas |
| 10,326,975 B2 | 6/2019 | Casas |
| 10,390,890 B2 | 8/2019 | Jagga |
| 10,405,987 B2 | 9/2019 | O'Neil et al. |
| 2004/0059217 A1 | 3/2004 | Kessman et al. |
| 2007/0195931 A1 | 8/2007 | Ohishi |
| 2009/0018445 A1 | 1/2009 | Schers et al. |
| 2015/0351860 A1 | 12/2015 | Piron et al. |
| 2017/0281122 A1 | 10/2017 | Mahfouz et al. |
| 2018/0338814 A1 | 11/2018 | Saget et al. |
| 2020/0113543 A1 | 4/2020 | Wasielewski |
| 2020/0146635 A1 | 5/2020 | Wang et al. |
| 2021/0042878 A1 | 2/2021 | Ghose et al. |

OTHER PUBLICATIONS

Fanti et al, "Improved surface-based registration of CT and intraoperative 3D ultrasound of bones," Journal of Healthcare Engineering, Jun. 2018, vol. 2018, 11 pages.
International Preliminary Report on Patentability in International Appln. No. PCT/US2022/018959, mailed on Sep. 14, 2023, 10 pages.
International Search Report and Written Opinion in International Appln. No. PCT/US2022/018959, mailed on May 16, 2022, 11 pages.
Nagpal, "Ultrasound to CT registration of the lumbar spine: a clinical feasibility study," Thesis for the degree of Master of Science, Queen's University, Aug. 2013, 118 pages.
Extended European Search Report in European Appln. No. 22764159.4, mailed on Dec. 23, 2024, 11 pages.
Salehi et al., "Precise Ultrasound Bone Registration with Learning-Based Segmentation and Speed of Sound Calibration," Medical Image Computing and Computer-Assisted Intervention—MICCAI 2017, Sep. 4, 2017, pp. 682-690.

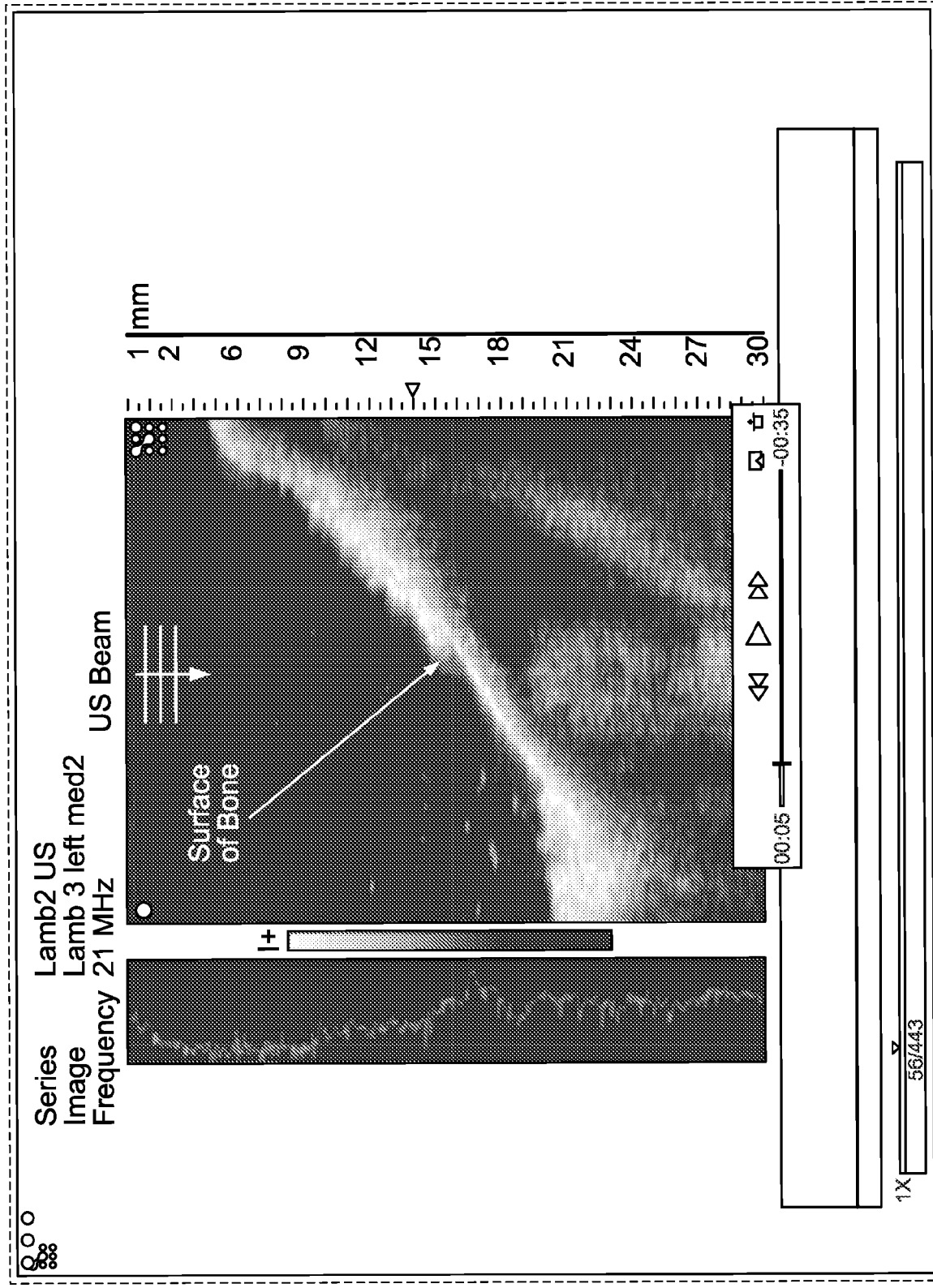

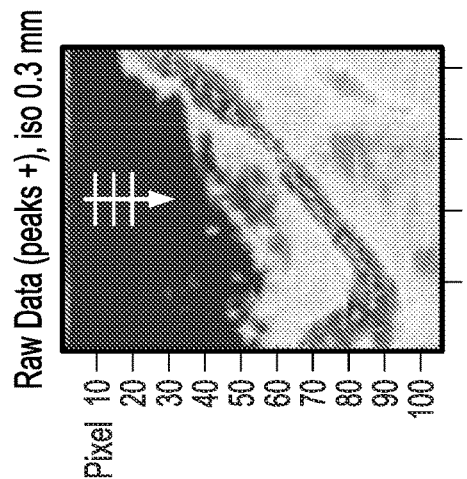
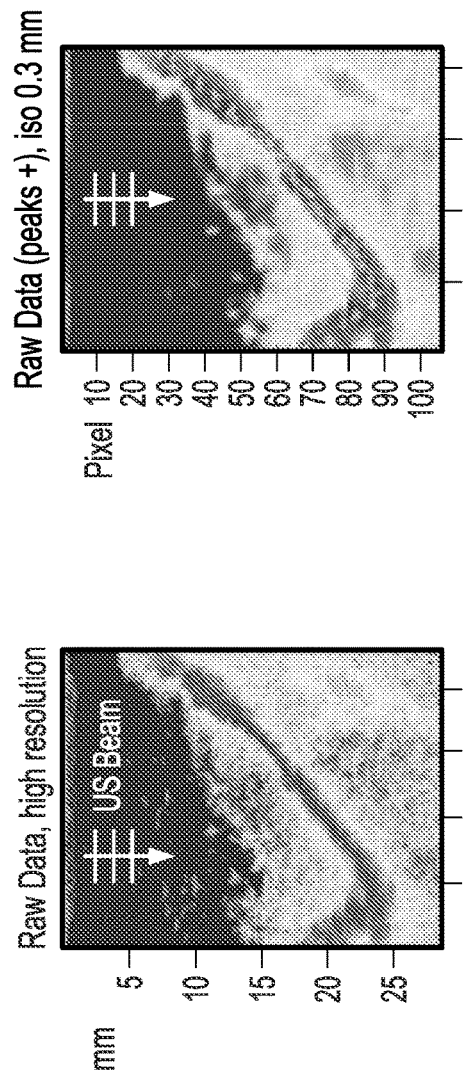
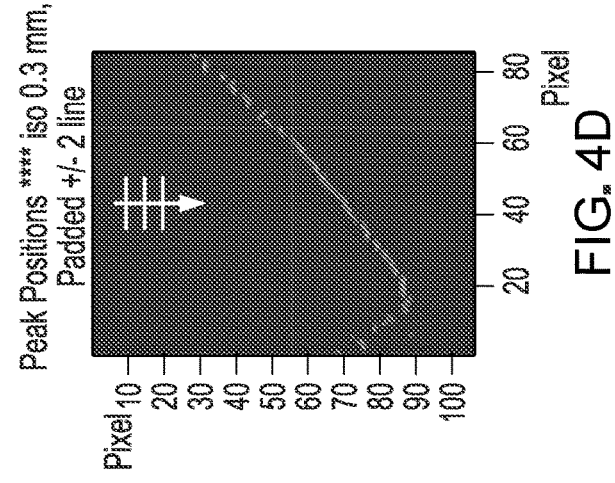
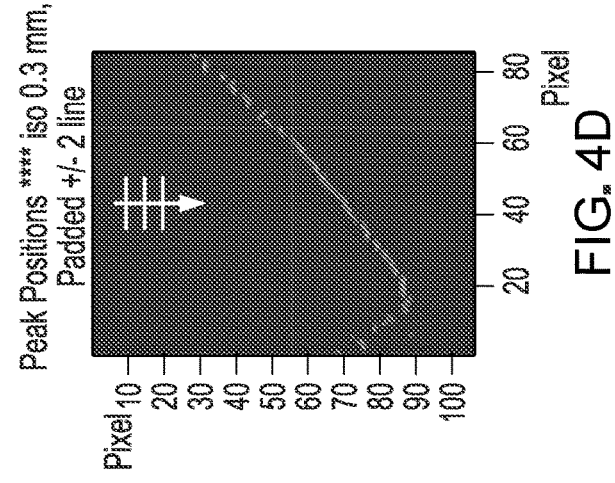
FIG. 4A
FIG. 4B
FIG. 4C
FIG. 4D 1 pixel = 0.27 x 0.275 mm²

Green: US surface reconstruction
Magenta: CT surface reconstruction
White: Overlap CT and US surfaces

RADIOLOGICALLY NAVIGATED INTRA-OPERATIVE SPINAL GUIDANCE SYSTEM

CROSS-REFERENCE TO RELATED APPLICATIONS

This application is a U.S. 371 application from PCT/US2022/018959 filed Mar. 4, 2022, which claims the benefit of U.S. Provisional Application No. 63/157,483 filed Mar. 5, 2021, the disclosures of which are incorporated herein.

TECHNICAL FIELD

This description generally relates to intra-operative procedures, especially navigation during intra-operative procedures.

BACKGROUND

Current surgical procedures, particularly spinal procedures, carry significant risks. One such risk involves the placement of implants and devices adjacent to vulnerable structures of the neurologic and vascular systems of the body. Reducing the risk of poorly or misplaced instruments and implants would be advantageous despite considerable progress in operator training and imaging systems. Another issue associated to spinal fusion is the reshaping of the spine induced by positioning the patient and various surgical procedures which can compound image registration based on X-Ray fluoroscopy. Moreover, current imaging systems are cumbersome and expensive.

SUMMARY

In one aspect, some implementations provide a computer-implemented method that includes: accessing, ultrasound data obtained from intra-operatively insonifying a region of a patient using an ultrasound probe wherein the ultrasound data encode, in real-time, 3D surface information of one or more bone structures in the region as well as locational information of the one or more bone structures relative to the ultrasound probe; extracting a first 3D surface representation of the one or more bone structures based on the ultrasound data; accessing non-ultrasound imaging data obtained from performing non-ultrasound imaging of the region of the patient prior to the surgical procedure, the non-ultrasound imaging data including 3D surface anatomical information of the one or more bone structures in the region; extracting a second 3D surface representation of the one or more bone structures based on the non-ultrasound imaging data; identifying, using a deep learning algorithm, one or more regions of interest (ROI)s from the first 3D surface representation such that when aligning the first 3D surface representation and the second 3D surface representation over the one or more regions of interest (ROI)s, a spatial transformation is determined; and based on applying the spatial transformation, generating an overlay of the 3D surface anatomical information from the non-ultrasound imaging data on the 3D surface information from the ultrasound data.

The implementations may include one or more of the following features.

Identifying the one or more ROIs may include: growing the identified one or more ROIs by adding an area from the first 3D surface representation where the first 3D surface representation and the second 3D surface representation are matched above a first threshold level. Identifying the one or more ROIs may include: pruning the identified one or more ROIs by subtracting an area from the first 3D surface representation where the first 3D surface representation and the second 3D surface representation are above a first threshold level. Identifying the one or more ROIs may include: training the deep learning algorithm to iteratively improve the spatial transformation such that the spatial transformation is achieved within a pre-determined time interval for the 3D surface anatomical information from the ultrasound data to be overlaid on the non-ultrasound data in real-time during the surgical procedure.

The deep learning algorithm may include: adjusting a number of the one or more ROIs, a size of the one or more ROIs, a location of the one or more ROIs, a first threshold level for determining a match between the first and second 3D surface representations, and a second threshold level for determining a noise characteristic of the first and second 3D surface representations. The deep learning algorithm may include: storing first templates of patches where the first 3D surface representation and the second 3D surface representation tend to match. The deep learning algorithm may include: based on the spatial transformation for at least one of the ultrasound data or the non-ultrasound imaging data, revising the first templates of ROIs where the first surface 3D representation and the second surface 3D representation tend to match. The deep learning algorithm may include: storing second templates of patches where the first 3D surface representation and the second surface representation tend to mismatch. The deep learning algorithm may include: based on the spatial transformation for at least one of the ultrasound data or the non-ultrasound imaging data, revising the second templates of ROIs where the first 3D surface representation and the second 3D surface representation tend to mismatch.

The implementations may further include: based on aligning the first 3D surface representation and the second 3D surface representation over the one or more ROIs, tracking a displacement of the one or more bone structures in the region between the non-ultrasound imaging data obtained prior to the surgical procedure and the ultrasound data obtained during the surgical procedure; and based on the spatial transformation, quantifying the displacement of the one or more bone structures in the region between the non-ultrasound imaging data obtained prior to the surgical procedure and the ultrasound data obtained during the surgical procedure.

The implementations may further include: based on the tracked displacement, updating, in real-time, a navigational guidance to an operating surgeon during the surgical procedure such that a position of the ultrasound probe can be adjusted. The implementations may further include: in response to the ultrasound probe being repositioned to insonify the one or more bone structure during the surgical procedure, refreshing the spatial transformation such that the overlay of the 3D surface anatomical information from the non-ultrasound imaging data on the 3D surface anatomical information from the ultrasound data is updated, wherein the ultrasound data is obtained from the repositioned ultrasound probe.

The implementations may further include: tracking, using the ultrasound data, a location of a device during the surgical procedure, wherein the device comprises: a surgical instrument, an implant, or a stimulator device; and projecting the tracked location of the device on the overlay where the 3D surface information of the one or more bone structures from the non-ultrasound imaging data is overlaid on the 3D surface information of the one or more bone structures from the ultrasound data.

Extracting the first 3D surface representation may include: determining a tissue-bone interface based on applying a method that comprises a forward tracing method, or a back shadow method, wherein the method is performed along an ultrasound propagation direction to determine a tissue-bone interface, and wherein the method is performed without encountering reverberations from the tissue-bone interface.

The non-ultrasound imaging data may include: a computed tomography (CT) image, or a magnetic resonance imaging (MRI) image, wherein the MRI image comprises: a zero echo-time (TE) MRI image, and wherein the computer-implemented method is performed without accessing X-ray fluoroscopy data.

The region may include a spinal column region, a pelvic region, a sacral region or an occipital region. The region may include at least one of humeri, elbows, radius, ulna, metacarpals, phalanges, scapula, ribs, iliac wings, femurs, patella, tibias, fibulas, or metatarsal. The region may include at least one of shoulders, elbows, wrists, hands, hips, knees, ankles or feet. The region may include an area for biopsy of one or more lesions within a bone, around the bone, and on the surface of the bone. The region may include one or more areas for a soft tissue or trigger point injection, and for injecting into (i) a joint for arthrocentesis, facet joint block, or arthrography, (ii) bursa or ganglia around one or more bones of at least one extremity, (iii) one or more ligamentous structures around the joint, (iv) one or more structural tunnels that include the carpal and tarsal tunnels in the hands or feet, or (v) one or more tendons.

In another aspect, the implementations may provide a system that includes: an ultrasound probe operable to insonify a region of a patient; a display device capable of providing real-time visual feedback during the surgical procedure; and a computer processor in communication with the ultrasound probe and the display device, the computer processor configured to: access ultrasound data obtained from intra-operatively insonifying the region of the patient during the surgical procedure, wherein the ultrasound data encode, in real-time, 3D surface information of one or more bone structures in the region as well as locational information of the one or more bone structures relative to the ultrasound probe; extract a first 3D surface representation of the one or more bone structures based on the ultrasound data; access non-ultrasound imaging data obtained from performing non-ultrasound imaging on the region of the patient prior to the surgical procedure, the non-ultrasound imaging data including 3D surface anatomical information of the one or more bone structures in the region; extract a second 3D surface representation of the one or more bone structures based on the non-ultrasound imaging data; identify, using a deep learning algorithm, one or more regions of interest (ROI)s from the first 3D surface representation such that when aligning the first 3D surface representation and the second 3D surface representation over the one or more regions of interest (ROI)s, a spatial transformation is determined; and based on applying the spatial transformation, generate an overlay of the 3D surface anatomical information from the non-ultrasound imaging data on the 3D surface information from the ultrasound data.

The implementations may include one or more of the following features.

The computer processor may be further configured to: track, using the ultrasound data, a location of a surgical instrument during the surgical procedure; and project the tracked location of the surgical instrument on the overlay where the 3D surface information of the one or more bone structures from the non-ultrasound imaging data is overlaid on the 3D surface information of the one or more bone structures from the ultrasound data, wherein the surgical instrument is operable to facilitate placing a pedicle screw, an implant, or a stimulator, in the region during the surgical procedure.

The computer processor may be further configured to: based on aligning the first 3D surface representation and the second 3D surface representation over the one or more ROIs, track a displacement of the one or more bone structures in the region between the non-ultrasound imaging data obtained prior to the surgical procedure and the ultrasound data obtained during the surgical procedure; and based on the tracked displacement, update, in real-time, a navigational guidance to an operating surgeon during the surgical procedure such that a position of the ultrasound probe can be adjusted.

The display device may be configured to refresh, in real-time, the overlay of the 3D surface anatomical information from the non-ultrasound imaging data on the 3D surface information from the ultrasound data such that an augmented reality rendering is provided to navigate an operating surgeon during the surgical procedure. The display device may include a wearable device, and wherein the ultrasound probe comprises a wireless ultrasound probe.

The system may further include: a tracking system configured to provide real-time tracking information of the ultrasound probe during the surgical procedure, wherein the real-time tracking information of the ultrasound probe, when combined with locational information of the one or more bone structures relative to the ultrasound probe, is translatable to a navigational guidance to an operating surgeon with respect to positioning the ultrasound probe during the surgical procedure. The tracking system may include at least one of: an optical tracker, a stepped motor, an electromagnetic sensor, an accelerator, or a gyroscope.

The region may include a spinal column region, a pelvic region, a sacral region or an occipital region. The region may include at least one of humeri, elbows, radius, ulna, metacarpals, phalanges, scapula, ribs, iliac wings, femurs, patella, tibias, fibulas, or metatarsal. The region may include at least one of shoulders, elbows, wrists, hands, hips, knees, ankles or feet. The region may include one or more areas for biopsy of one or more lesions within a bone, around the bone, and on the surface of the bone. The region may include one or more areas for a soft tissue or trigger point injection, and for injecting into (i) a joint for arthrocentesis, facet joint block, or arthrography, (ii) bursa or ganglia around one or more bones of at least one extremity, (iii) one or more ligamentous structures around the joint, (iv) one or more structural tunnels that include the carpal and tarsal tunnels in the hands or feet, or (v) one or more tendons.

In yet another aspect, some implementations provide: accessing, ultrasound data obtained from insonifying a region of a patient using an ultrasound probe wherein the ultrasound data encode, in real-time, 3D surface information of one or more bone structures in the region as well as locational information of the one or more bone structures relative to the ultrasound probe; extracting a first 3D surface representation of the one or more bone structures based on the ultrasound data; accessing non-ultrasound imaging data obtained from performing non-ultrasound imaging of the region of the patient, the non-ultrasound imaging data including 3D surface anatomical information of the one or more bone structures in the region; extracting a second 3D surface representation of the one or more bone structures based on the non-ultrasound imaging data; identifying, using a deep learning algorithm, one or more regions of interest (ROI)s from the first 3D surface representation such that when aligning the first 3D surface representation and the second 3D surface representation over the one or more regions of interest (ROI)s, a spatial transformation is determined; and based on applying the spatial transformation, generating an overlay of the 3D surface anatomical information from the non-ultrasound imaging data on the 3D surface information from the ultrasound data.

BRIEF DESCRIPTION OF THE DRAWINGS

Embodiments will now be described, by way of example only, with reference to the drawings, in which:

FIG. 3 illustrates an example of an intra-operative ultrasound (US) image of a vertebra according to some implementations of the present disclosure.

FIGS. 4A to 4D illustrate examples of identifying the osseous surface based on the intra-operative US data according to some implementations of the present disclosure.

Like reference symbols in the various drawings indicate like elements.

DETAILED DESCRIPTION

Figure 1:
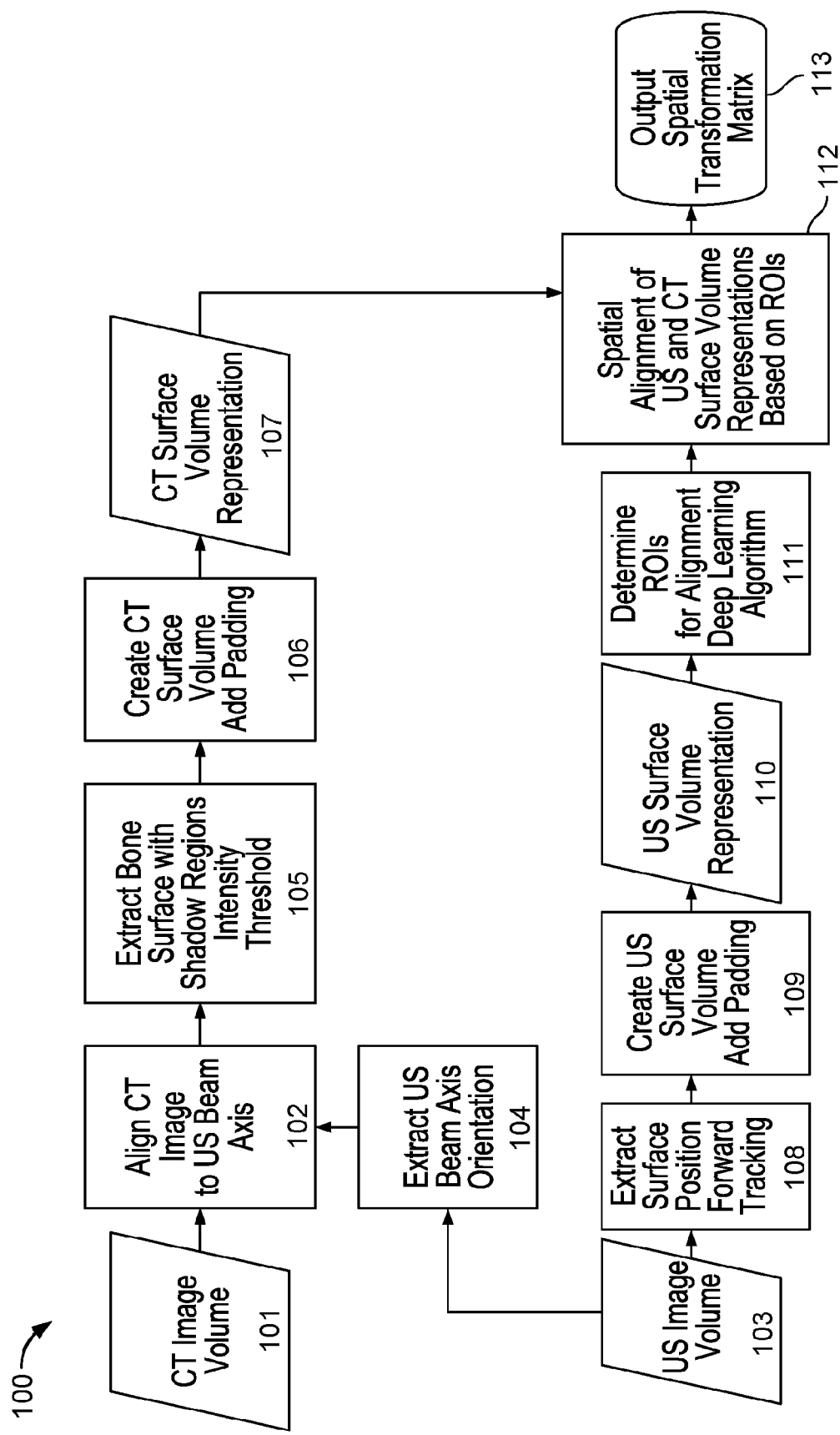
FIG. 1 shows an example of a diagram illustrating a workflow as used by some implementations of the present disclosure.

The past decades have witnessed great strides of intra-operative imaging systems to enhance the visibility of structures within the patient. Navigation systems have also evolved to provide the surgeon with guidance of the safe trajectories for surgical procedures. However, these systems typically require either fine-cut CT scans pre-operatively in addition to intra-operative fluoroscopic images or intra-operatively acquired fluoroscopic CT scans. These acquisition modes can expose patients and in some instances medical professionals to extensive radiation doses. Additionally, during the intra-operative procedure, a reference marker affixed to the patient is displaced, thereby opening the gate to a moving target. In such a circumstance, additional radiographic images can markedly slow down the procedural flow and risk the contamination of the surgical field.

Implementations described by the present disclosure provide a novel system of ultrasound-based referencing of spinal landmarks coupled with a conventional camera-based navigation system or an augmented reality system. The basis of the disclosed system relates to intra-operative use of an ultrasound device displaced over a patient or an exposed surgical field, which can be filled with saline solution or gel to provide coupling for the ultrasound waves to propagate into the patient's body. Intra-operative use can refer to the use of an instrument during a surgical operation. The disclosed system can be coupled to a computer system which has pre-operative surface topography calculated from conventional computed tomography (CT) or magnetic resonance imaging (MRI). In the disclosed system, when the ultrasound probe is displaced, sensors, gyroscopes, or optical trackers can be used to determine displacement and orientation such that the 3D surface of the vertebrae can be assessed and updated. Furthermore, coupling the displacement of the ultrasound probe to an augmented reality headset can permit the operating surgeon to visualize the precise position of vertebra with overlay images from the pre-operative CT or MRI. Additionally or alternatively, the disclosed system can track the ultrasound probe displacement with camera navigation in relation to a fixed reference marker attached to the patient. The disclosed system can use a deep learning or artificial intelligence (AI) algorithm to identify bony surfaces of the osseous spine based on intra-operative ultrasound (US) data in real-time. Implementations may intelligently select areas or "patches/ROIs" from the intra-operative US data. In other words, the deep learning or AI algorithm may be trained to identify these "patches," which, when taken in conjunction with one another, can serve as a "thumbprint" of each, single vertebra. Indeed, implementations can treat each vertebra separately as patient movement would induce spatial changes between the positions of the vertebral bodies. In these implementations, the AI algorithm can then match these "thumbprints" of the vertebral body on intra-operative ultrasound data with pre-operative CT/MRI images during the surgical procedure in-real time. Using the surface data and navigated US probe, a 3D osseous surface of the posterior spine can be created in real-time. Using the disclosed system, the operating surgeon, can visualize the real-time displacement of tracked instruments and/or implants (again with tracking beads through the camera based system) as well as implants on a screen display where an overlay on the pre-operative imaging is provided.

The advantages of the disclosed system include intraoperative use of ultrasound probes to map and match surface topography in relation to segmented pre-operative imaging (CT, MRI). The advantages of this system also include radiation-free intra-operative navigation, improved acquisition speed of surface topography, decreased burden of workflow, and reduced infection risk. The current need for fluoroscopic imaging, at times repeatedly for one procedure, is time-consuming and exposes the patient and clinical team to radiation. Furthermore, repeated introduction of bulky fluoroscopic equipment can create a risk environment for contamination of the operative field.

Figure 2:
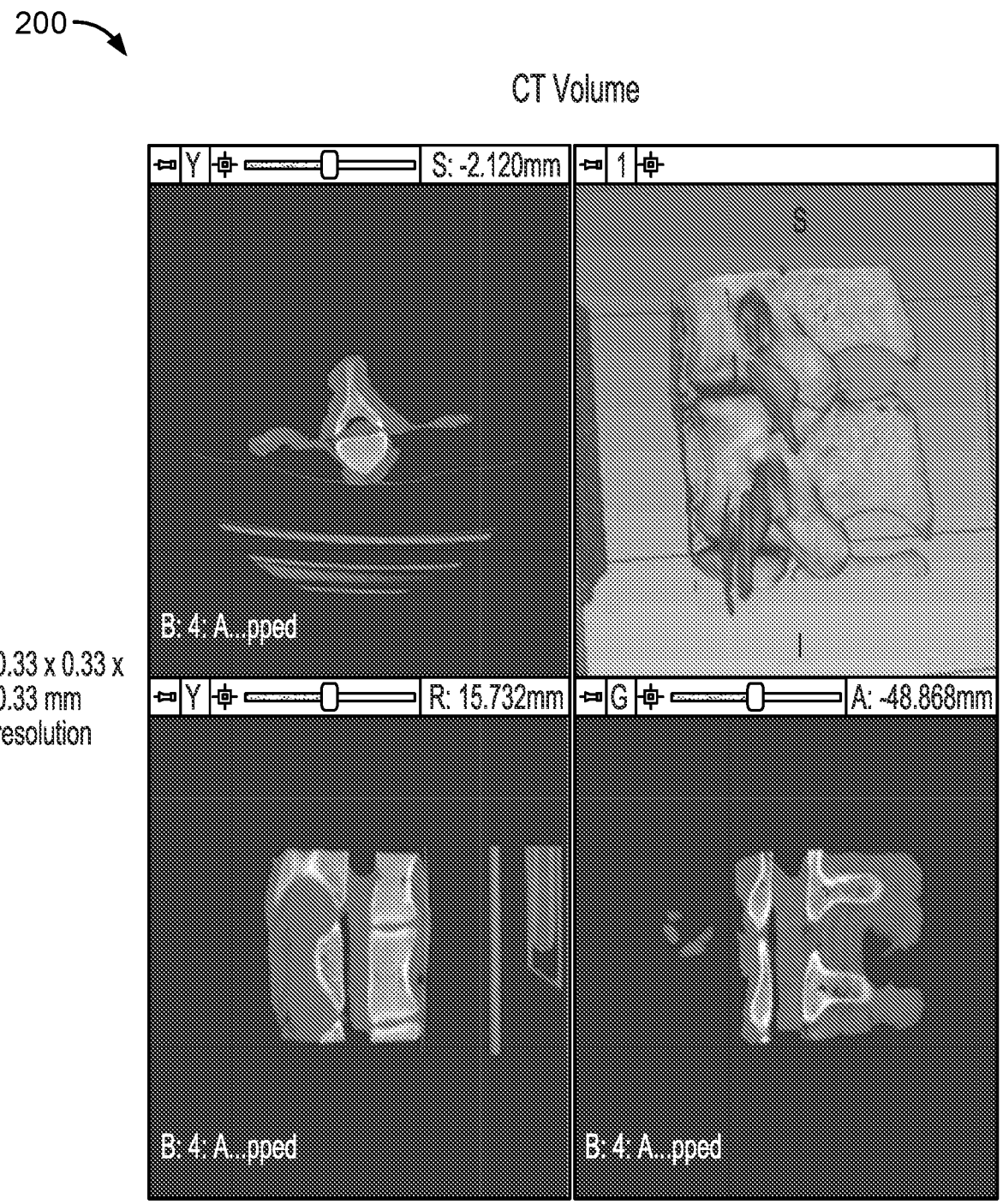
FIG. 2 illustrates an example of pre-operative high-resolution CT images of the vertebrae as used by some implementations of the present disclosure.

FIG. 1 shows an example of diagram 100 illustrating a workflow as used by some implementations of the present disclosure. As illustrated, diagram 100 imports CT image volume 101 and US image volume 103. In some implementations, CT image volume 100 refers to a high-resolution CT image of the patient's spinal region obtained before the surgical procedure. Implementations are not limited to the spinal column such as the vertebral region. The regions can include a pelvic region, a sacral region, or a occipital region. Referring to example 200 from FIG. 2, in some cases, the pre-operative high-resolution CT images of the vertebral bodies of the spine can have a resolution of 0.33 mm by 0.33 mm by 0.33 mm. In some implementations, the spatial resolution can be even smaller than the resolution provided by example 200. The implementations are not limited to using high-resolution CT images. Indeed, high-resolution magnetic resonance imaging (MRI) images can also be used. For example, some implementations can incorporate a zero echo time (TE) fast MRI data set obtained before the surgical procedure. Implementations may incorporate segmentation to identify the osseous external surface of individual vertebrae (vertebral bodies and posterior elements) from the pre-operative image data set to obtain a 3D representation of individual vertebrae. The segmentation can result in successful labeling of the individual vertebra to reveal the shape of the posterior elements at each vertebral level as well as specific anatomical landmarks along the spinal cord.

Ultrasound (US) image volume 103 may refer to intra-operative ultrasound data obtained during the surgical procedure from an ultrasound probe, typically with an array of ultrasound transducer elements. The intra-operative ultrasound may cover the same region as the pre-operative images. For example, a surgeon may scan the posterior bony surface of the spine with the ultrasound probe. In some cases, a wireless ultrasound probe may be used. The scanning can be performed by passing the ultrasound probe along skin surface in area of interest, or directly in a surgical wound which has been filled with saline or other gel/fluid adapted for ultrasound insonification. An initial sweep of the spine could be performed in order to identify the osseous level e.g., L1, L2 L3 etc. The initial sweep can be a quick, coarse pass with sufficient accuracy to detect spinal levels L1, L2, L3 etc. but not necessarily more fine grained to visualize the full bony detail. The initial sweep can be followed by a second, more detailed sweep to more accurately visualize full bony details of the spine. The detailed second sweep may identify bony landmarks for guidance of screws and plates into the spine. For example, the detailed sweep can generate 3-D ultrasound coverage of the posterior surface of the spine, as the operating surgeon moves the probe over the skin to scan the region of interest. For open surgical procedures, the operating surgeon can use either water or gel-based substance to cover the anatomy of interest. The ultrasound probe can be displaced by smooth movement in varying directions and angulations in order to obtain a surface mapping of the spinal region of interest.

Notably, the implementations are not limited to the spine region. For example, the implementations may include imaging guided systems for biopsy of lesions within a bone, around the bone, and on the surface of the bone. Examples of bone include humeri, elbows, radius, ulna, metacarpals, phalanges, scapula, ribs, iliac wings, femurs, patella, tibias, fibulas, metatarsal. Implementations may also include diagnosis of a joint and guidance in joint replacement for a joint in the extremities including shoulders, elbows, wrists, hands, hips, knees, ankles and feet. Implementations may also include imaging guided injection of periarticular or intraarticular structures in and around the extremities such as humeri, elbows, radius, ulna, metacarpals, phalanges, scapula, ribs, iliac wings, femurs, patella, tibias, fibulas, and metatarsal. The injections may include needle injection into joints for arthrocentesis, facet joint block, or arthrography, needle injection into bursa or ganglia around the bones of the extremities, soft tissue or trigger point injections, injection into ligamentous structures around the joints, injection into structural tunnels such as the carpal and tarsal tunnels in the hands and feet respectively and injection of tendons or tendon sheaths. For context, a trigger point injection can help soothe muscle pain, especially in the arms, legs, lower back and neck. The trigger point injection also can be used to treat fibromyalgia, tension headaches and myofascial pain. Trigger points generally refer to painful "knots" in a muscle when the muscle is, for example, over stretched and becomes unable to relax.

In these implementations, ultrasound image volume 103 can be imported by a computing device. In some cases, ultrasound image volume 103 can be the raw ultrasound data from each transducer element on the ultrasound probe. The raw ultrasound data may be obtained before beamforming that generates the B-mode data of an ultrasound image. The raw ultrasound data may also include raw in-phase/quadrature (I/Q) or also may include the raw pre-beamformed RF data. In other cases, the B-mode data can be imported. Implementations may apply multiple methods to improve detailed ultrasonographic visualization of the osseous surface. The methods may include varying of the speed of sound configuration on the ultrasound scanner to sharpen the details and edges of the osseous surface. The method may also exploit the propagation of sound through tissues of varying densities to improve the sensitivity of detecting the osseous surface. For example, sound propagates much faster through bone than soft tissue. The methods may further include measuring ultrasonographic impedance as the ultrasound propagates through bone and soft tissue to facilitate the detection of the osseous surface. The method may also include using multiple focal zones in both the vertical and horizontal planes relative to the ultrasound probe to sharpen the osseous surface. The method may additionally include the use of elastography, which is an imaging technique that can evaluate: the mechanical properties of tissue according to the propagation of mechanical waves. For example, an imaging apparatus (such as an ultrasound apparatus) may be coupled with a device that generates mechanical waves, typically shear waves within the tissue of interest while the imaging apparatus visualizes tissue deformation. These methods can be used in conjunction with 2D, 3D, and 4D ultrasound scanning. The ultrasound image volume 103 may include location data of the ultrasound probe relative to the spinal structure. The importation process may also import position data from a navigation system. The computing device can be a device within the surgical field or outside. In either case, the computing device can implement a deep learning or an AI algorithm to identify bony surface of the osseous spine based on the US image volume 103 in real-time.

Implementations may extract information encoding ultrasound beam axis orientation from US image volume (104). Further referring to FIG. 3, an example of one frame of raw I/Q data is presented. As illustrated, the bony surface is approximately at a diagonal angle and the direction of ultrasound beams is approximately vertical, originating from the surface of the array elements of the ultrasound probe located at the top of the image. To the left of the image, a cross-sectional profile is presented, illustrating a reflection at the bony interface, as well as reverberations beyond the bony interface. Some implementations may leverage the raw data, for example, in-phase and quadrature (IQ) or Rf data, imported from the ultrasound probe. While conventional B-mode image may include beam formed data that delineate the underlying anatomical structure, such beamformed data may lack an adequate dynamic range due to rebinning and post-processing during the beamforming process. The raw I/Q or RF data, on the other hand, can be superior, for example, more sensitive, for detection of a bony surface.

Further referring to FIG. 4A, some implementations may leverage the raw ultrasound data to generate B-mode images with a vertical resolution of 0.018 mm and a horizontal resolution of 0.09 mm. In these implementations, the generated B-mode images may be further processed to have a more isotropic spatial resolution, for example, a vertical resolution of 0.27 mm and a horizontal resolution of 0.275 mm, as illustrated in FIG. 4B. Based on the more isotropic format, various implementations may use forward tracking and the raw I/Q or RF data to improve detection of the bony surface (108). Referring to FIG. 4C, thresholding alone may not generate a consistent surface representation. Further referring to FIG. 4D, some implementations combine peak detection with padding to achieve a more consistent volume representation of the surface. In some cases, the padding may include two pixels on both sides of the detected peak. Using the identified surface and navigation data of the ultrasound probe, a 3D osseous surface of the posterior spine can be created in real-time. As illustrated, some implementations may thus generate a volume representation of the surface of each vertebral body from the imported ultrasound image volume (e.g., raw I/Q or RF data from each array element of the ultrasound probe) (109). Implementations can treat each vertebral body separately to accommodate patient movement, which can give rise to spatial changes between the positions of the vertebral bodies. The created ultrasound surface volume representation (110) may be used for aligning with surface volume representation based on pre-operative CT.

In parallel, the implementations may align the pre-operative high-resolution CT images with the extracted ultrasound beam axis (102). Implementations may register surface of bone by identifying a thin 2-D region that represents the transition between tissue types. In these implementations, the registration may involve detecting, in the underlying CT intensity profile, the edge of a step function followed by osseous tissue. In comparison, the ultrasound intensity profile may exhibit a peak followed by a shadow region. To facilitate the alignment, the implementations may apply forward tracing to the pre-operative CT image volume to yield bone surface with shadow regions identified using an intensity threshold (105). The implementations may also apply back shadow tracking to identify the boundary. The implementations may then create a surface representation of the bony surface by identifying voxels that represent the surface and applying padding on both sides of the voxels to create volumes for alignment (106).

In more detail and further referring to FIGS. 5A to 5D, some implementations may identify the direction for the incident ultrasound beam (501). The implementations may then rotate the CT or MRI image volume so that the ultrasound beam is vertically incident (502). Here, the implementations may segment the bony surface using a simple threshold where the incident ultrasound beam is vertical (503). The implementations may simulate expected shadowed area of ultrasound beam. Results of the segmentation and padding may be rotated back to the original orientation of the CT or MIll image volume. The created CT or MRI surface volume representation (107) can be used for subsequent alignment of pre-operative CT or MIll and intra-operative ultrasound.

The implementations may then identify the regions of interest (ROIs) for alignment using deep learning algorithms (111). Based on the ROIs, the implementations may spatially align ultrasound surface volume representation and CT or MRI surface volume representation (112). The implementations may generate the spatial transformation matrix for performing the spatial alignment (113).

In more detail, various implementations match the ultrasound surface volume representation and CT or MRI surface volume representation. To improve the speed of the surface matching process and eliminate undesirable areas which contain excessive noise, the implementations may focus on areas or regions of interest (ROIs) with excellent spatial resolution on the ultrasound image volume. The implementations may leverage deep learning and AI to train the alignment process to identify the promising ROIs. For example, implementations can select ROIs that are more likely to yield matching surfaces (e.g., where the signal-to-noise ratio (SNR) is adequate). Conversely, the implementations may also prune areas from the ROIs that are unlikely to generate matching surfaces. In some implementations, the patches can include at least three pixels and located at distinctly separate areas on the posterior aspect of the spine, or the desired bone region (e.g., pelvic region). These promising ROIs, taken in conjunction, may appear as a "thumbprint" for each, single vertebral body to be used for matching the real-time 3D ultrasound surface representation to the 3D pre-operative CT/MRI surface representation. In some implementations, the "thumbprint" can be on the posterior surface of the bone region of interest (e.g., vertebra, pelvis, sacrum, occipital region). Each bone structure, or vertebra, can be treated individually as changes in patient position may distort the relationship between real-time ultrasound and pre-operative CT/MRI images. As the matching of ultrasound to pre-operative imaging mapped surfaces is provided in real time, the operating surgeon can be alerted as soon as a match has occurred. Some implementations can provide audio, visual, or tactile feedback to alert the operating surgeon when sufficient mapping has occurred to confirm an adequate surface has been covered by the ultrasound probe to achieve a matching with pre-operative images. These implementations can incorporate a wearable display device for projecting the matched results to the operating surgeon. In this immersed reality configuration, the wearable device can include a goggle device. Indeed, the implementations can provide a platform for mixed-reality, augmented reality, or virtual reality in which the operating surgeon can receive navigational guidance for the on-going surgical procedure. In some cases, the ultrasound probe can be a wireless probe.

In these implementations, a deep learning algorithm may incorporate a layered structure of algorithms, also known as artificial neural network (ANN), programmed to detect, for example, features of the ROIs with sufficient quality for matching intra-operative ultrasound images to pre-operative CT/MRI images. For example, the ANN layers can be trained over large sets of data and through exemplary selections to detect the ROIs that are expected to serve as guidepost to match intra-operative ultrasound images to pre-operative CT/MRI images. In contrast to other implementations that use static fiducial markers that are fixed after being placed, the implementations of the present disclosure can dynamically generate regions of interest (ROIs) based on intra-operative ultrasound scan. These ROIs are generated from each ultrasound scan and correspond to patches on the surface of bone structures where the ultrasound signal quality is sufficient (e.g., not hindered by multiple reverberations) for the purpose of morphing the intra-operative ultrasound image to the pre-operative CT/MRI images. The ROI are also generated dynamically in terms of area and size (e.g., with adaptive region growth/shrinkage approaches). Once these ROIs have been identified, the implementations can perform image overlay in which the intra-operative ultrasound image is overlaid on pre-operative higher resolution images (e.g., CT or MRI).

Figure 5A:
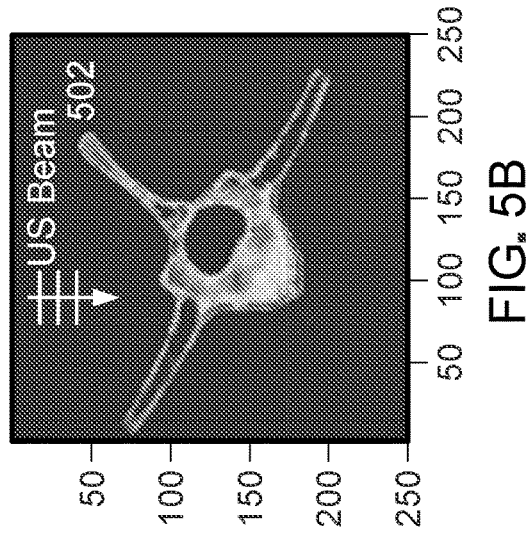
FIGS. 5A to 5D illustrate examples of aligning the surface representation from pre-operative CT images with the surface representation from intra-operative ultrasound according to some implementations of the present disclosure.
Figure 5B:
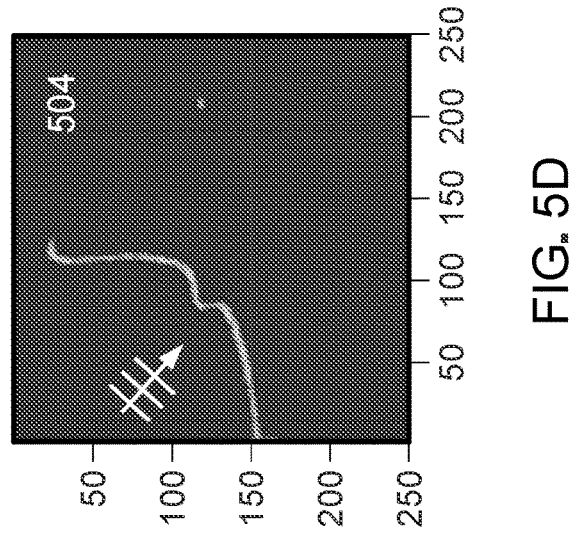
Figure 5C:
Figure 5D:
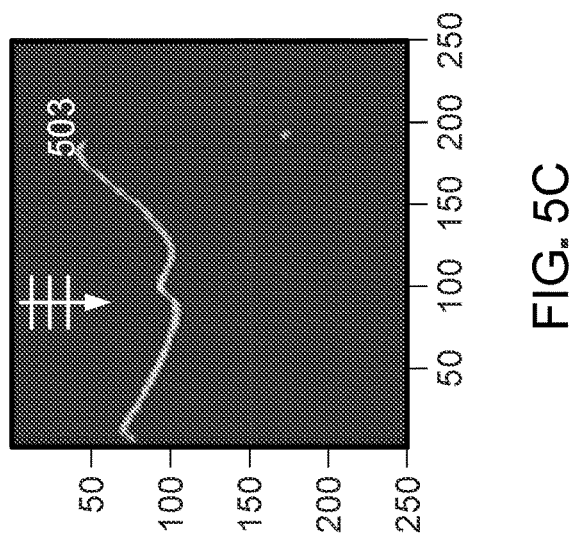
Figure 5F:
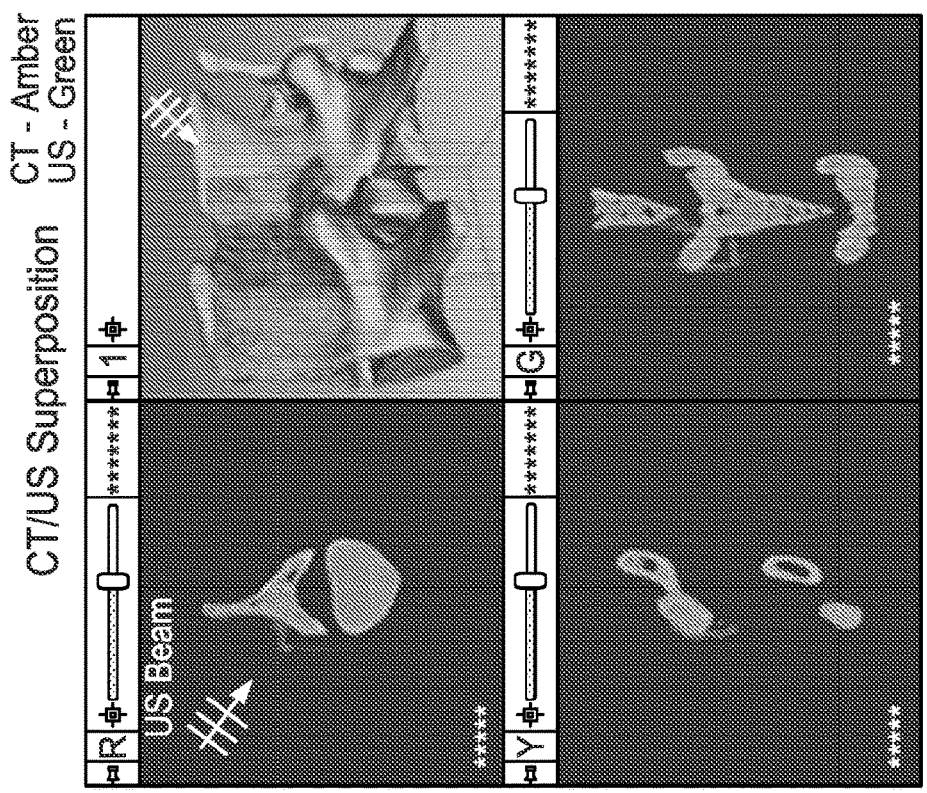
FIGS. 5E to 5F illustrate examples of superposition of pre-operative CT images and intra-operative US data according to some implementations of the present disclosure.
Figure 5E:
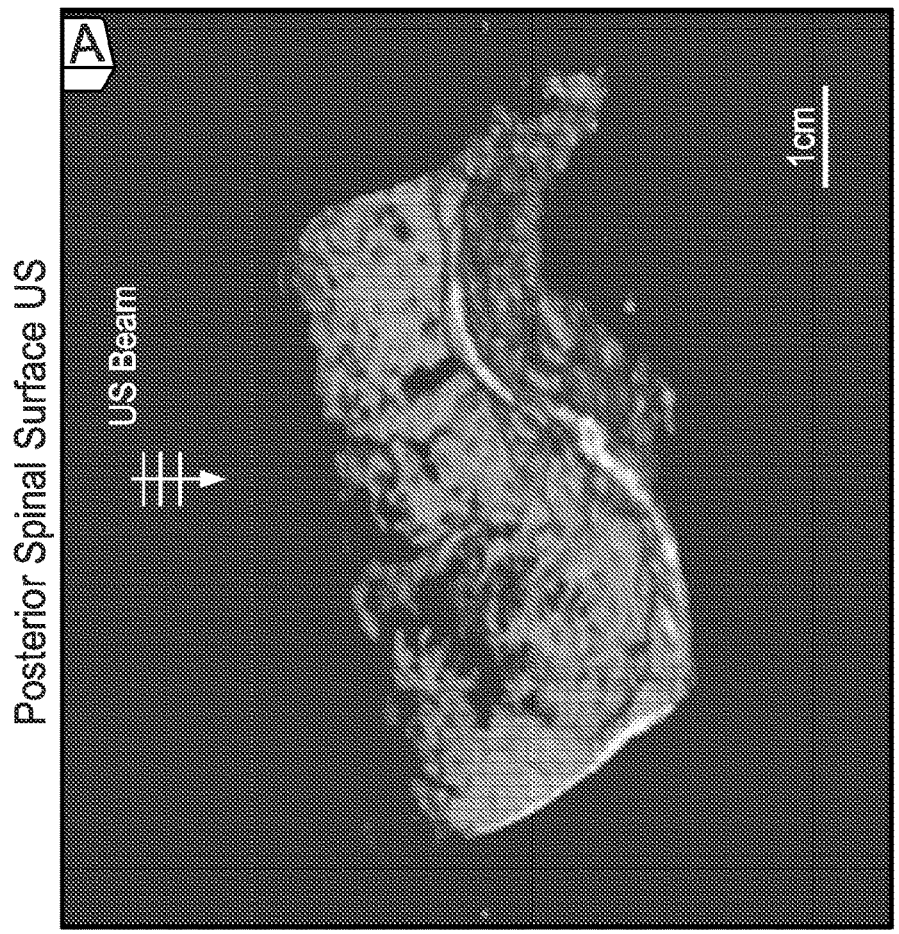

Further referring to FIG. 5E, an example of the posterior spinal surface is provided based on the ultrasound data. In this example, the ultrasound beam is incident vertically from the top. Referring to FIG. 5F, various examples are provided to illustrate superposition of pre-operative CT image volume with the ultrasound surface representation based on the direction of the incident ultrasound beam. As illustrated, the CT image volume can be rotated relative to the ultrasound beam so that the ultrasound surface representation is overlaid on the bony surface.

Figures 6A, 6B:
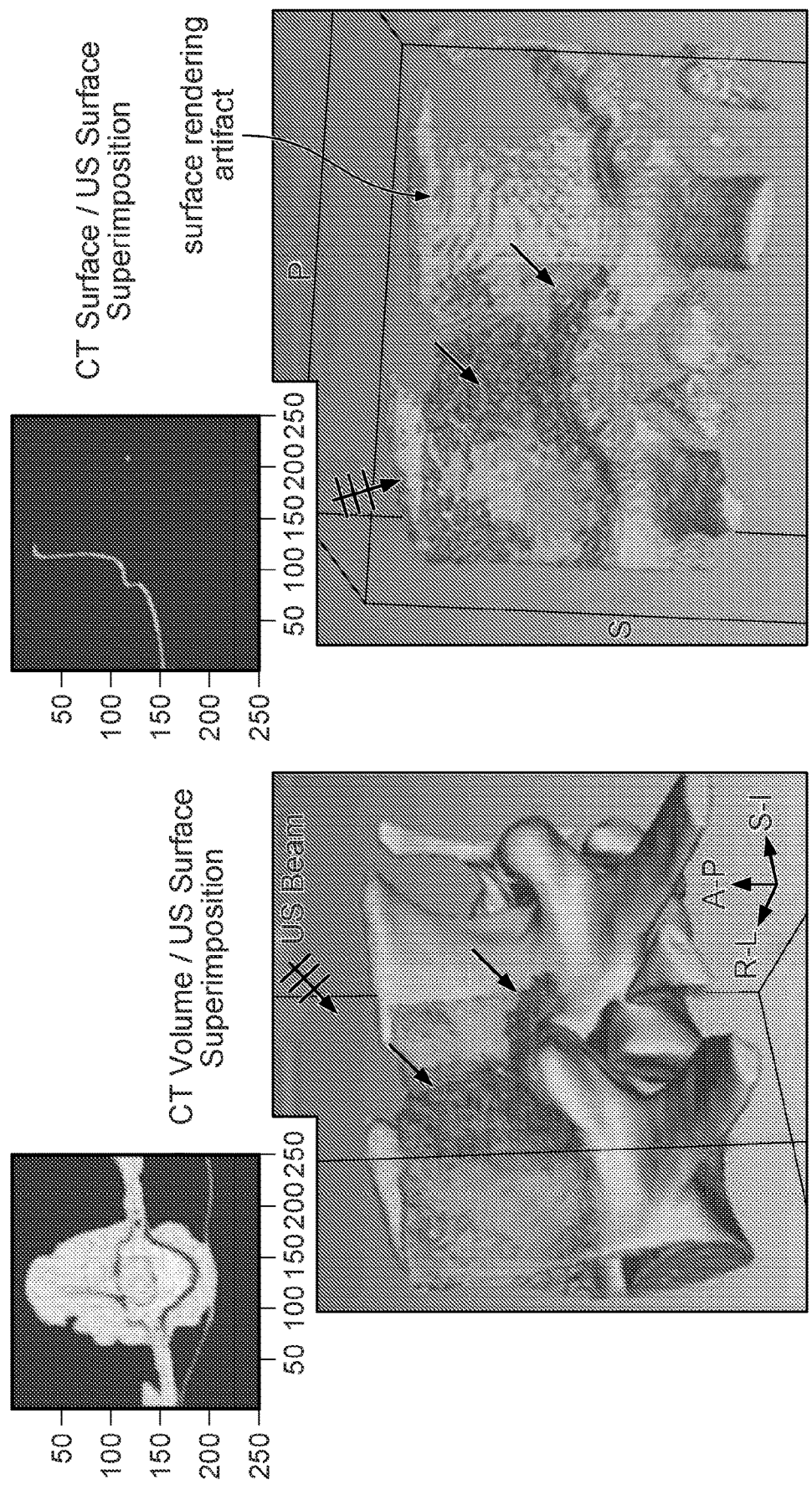
FIGS. 6A to 6B illustrate examples of superimposing pre-operative CT images with intra-operative US data according to some implementations of the present disclosure.
Figure 6C:
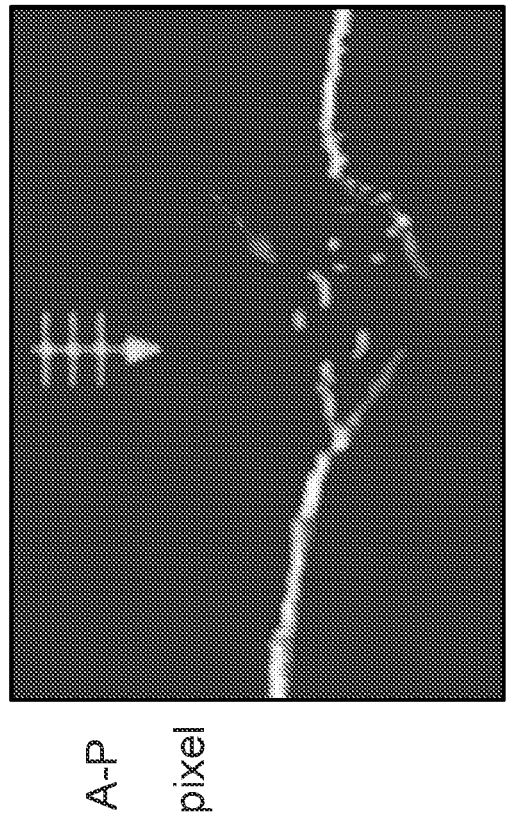
FIGS. 6C to 6D illustrate examples rendered surface resulting from superimposing pre-operative high-resolution CT images with intra-operative US data according to some implementations of the present disclosure.
Figure 6D:
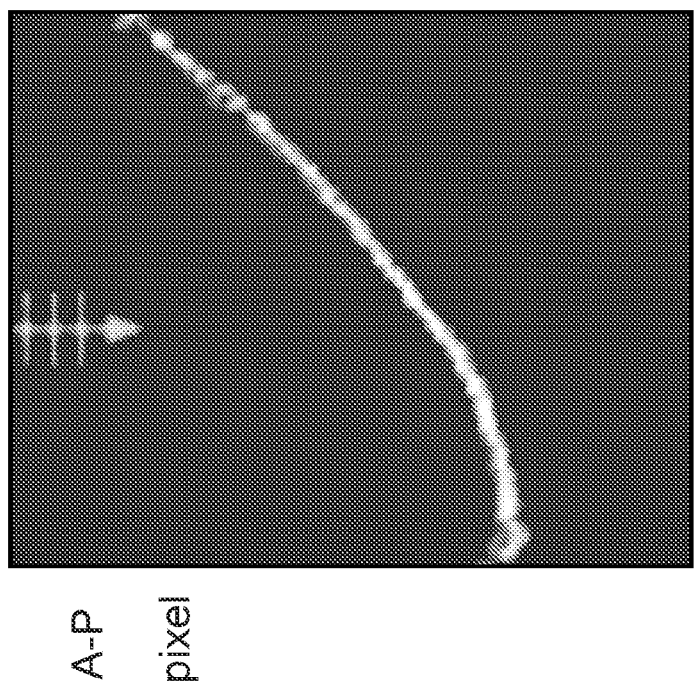

Further referring to FIGS. 6A to 6B, the illustrated examples of superimposing intra-operative US data (shaded with transparency) on pre-operative high-resolution CT images demonstrate a good match in regions over lamina, and transverse regions. In ligamentous areas between bones, however, the matching quality deteriorates significantly. FIG. 6B particularly illustrates a distribution of patches that cover various regions. Over the trough area where the ligaments are, the patches are more sparsely distributed. In some cases, the overlap between the surface representation from the ultrasound data and the surface representation from the pre-operative CT image may be continuous and more consistent, as shown in FIG. 6C. In other cases, the overlap between the surface representation from the ultrasound data and the surface representation from the pre-operative CT image may include gaps, as shown in FIG. 6D. To accommodate the various cases, the implementation can apply patches of varying sizes for matching purposes. Moreover, the implementations can intelligently adapt the sizes and the distribution of patches to yield high-quality matches.

Figure 7:
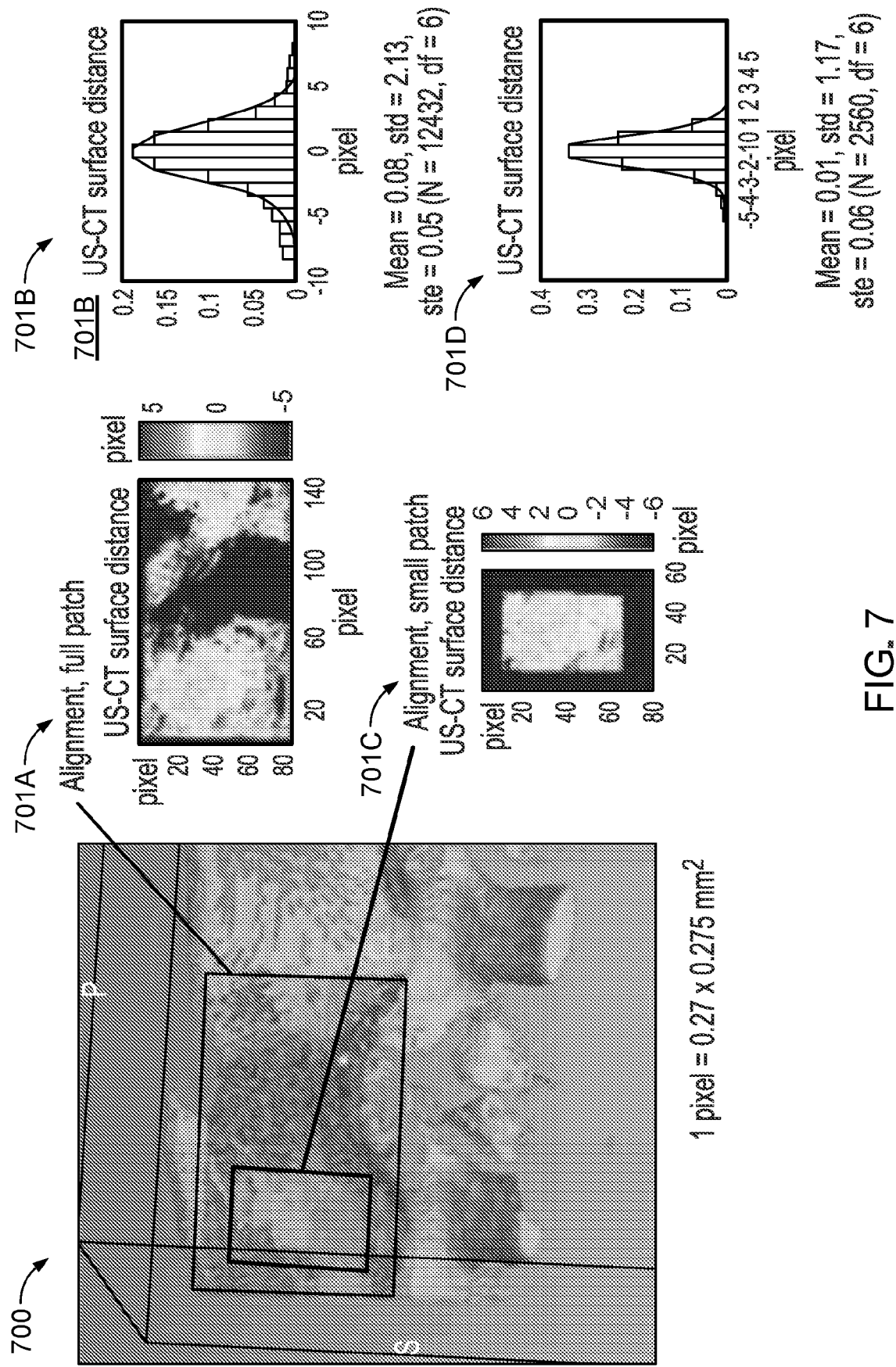
FIG. 7 illustrate examples of patches during an example of superimposing pre-operative CT images with intra-operative ultrasound data according to some implementations of the present disclosure.

Further referring to FIG. 7, panel 700 illustrates a surface with multiple areas as ROI candidates that include a full patch and a small patch. As illustrated, a full patch can include a larger area for aligning an ultrasound surface representation with a CT surface representation, while a small patch can refer to a partial mask for performing the alignment. Specifically, panels 701A and 701C each reveals the respective full patch and the small patch in 2D format where each pixel indicates the matching degree. In other words, if the match is perfect, the pixel becomes zero. The pixel-wise displays demonstrate that the full patch has multiple adjoining areas where the matching is decent. The small patch, on the other hand, shows a zoomed version of the left hand side of the full patch where the degree of match is more concentrated. The variation in distribution of matching quality is reinforced by panels 701B and 701D, each showing the respective the histogram of pixel values. As illustrated, panel 701B shows a larger mean with a higher standard deviation, which corresponds to a larger spread. In comparison, panel 701D shows a smaller mean with a smaller standard deviation, which corresponds to a smaller spread.

Figure 8A:
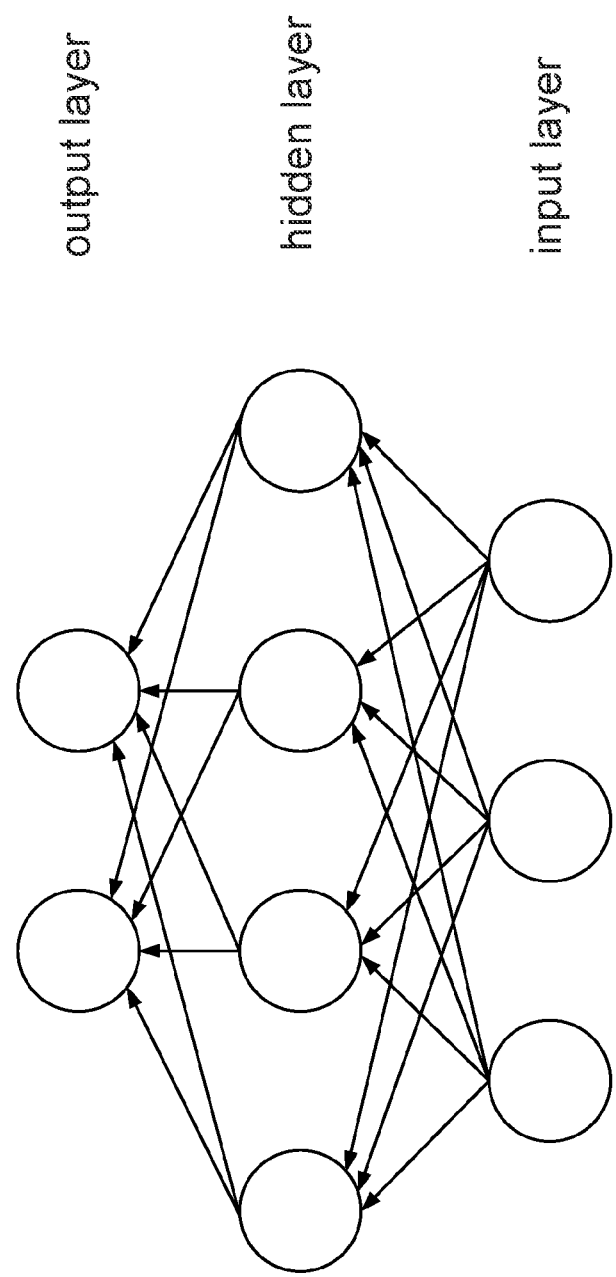
FIGS. 8A to 8C illustrate examples of flowcharts used by some implementations of the present disclosure.

Various implementations can use deep learning or AI algorithms to adaptively select patches where matches are more likely and promising. Referring to diagram 800 of FIG. 8A, implementations may use multiple layers of logic to determine the selected patches. The layers can include an input layer, one or more hidden layer, and an output layer. Each hidden layer may be a combination of one or more of: a convolutional layer, a pooling layer, a rectified linear unit (ReLU) layer, a softmax layer, a regressor layer, and a dropout layer. These hidden layers can be arranged in any order as long as the input/output size criteria are met. Each hidden layer can incorporate a set of image filters.

Figure 8B:
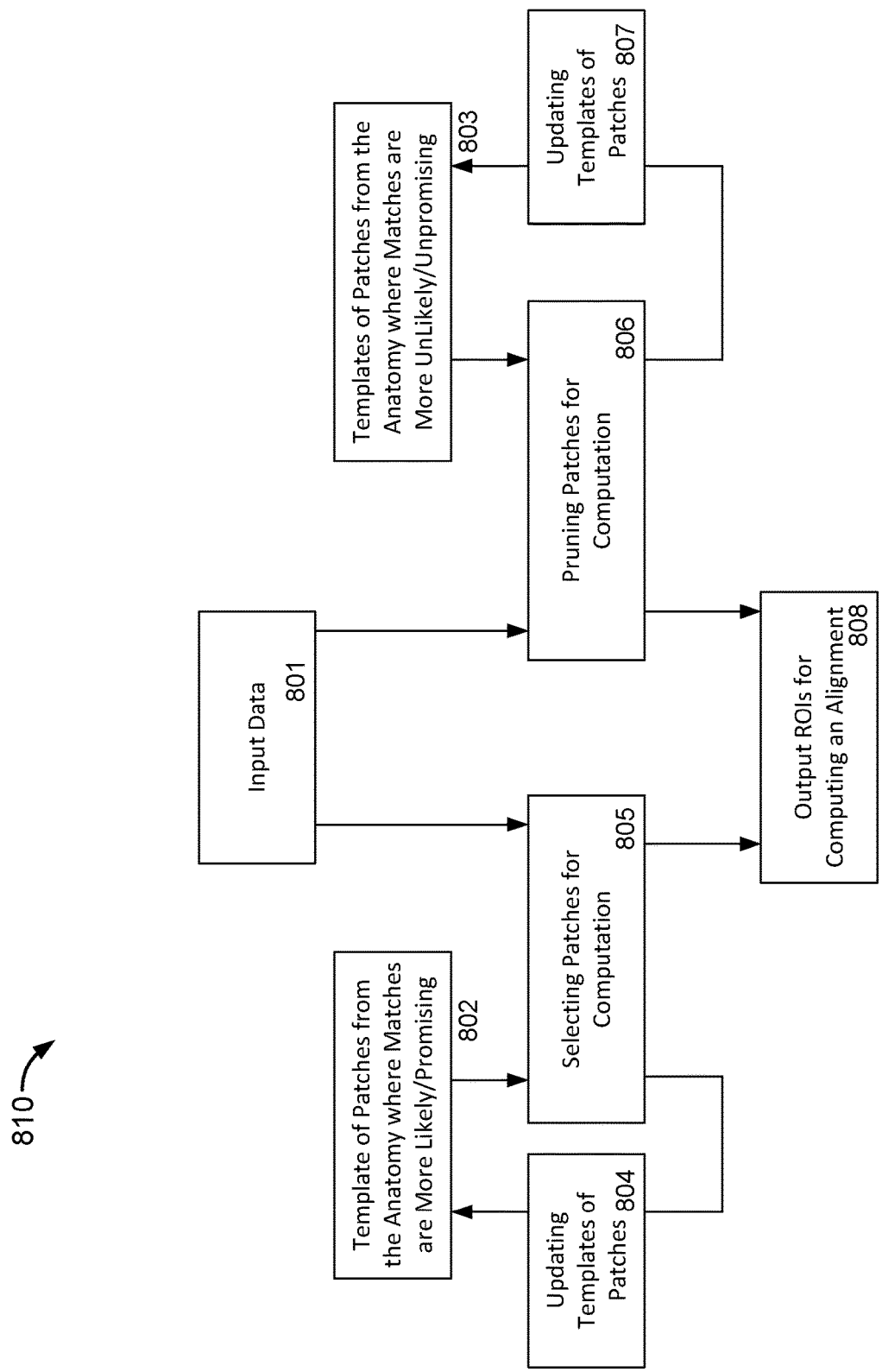

In more detail and referring to diagram 810 of FIG. 8B, an example of a work flow process can start with input data 801, which can include the intra-operative surface representations based on an intra-operative ultrasound data volume as well as the pre-operative surface representations based on pre-operative image volume. The implementations may select patches for matching the intra-operative surface representations with the pre-operative surface representations (805). The selection process may also receive templates of patches from the anatomy where matches are more likely and promising (802). The template of patches can be a library of patches determined based on past historical data as well as the specific insonification angles during the intra-operative procedure. During a surgical procedure, the insonification angle may be changed when the ultrasound probe is re-positioned. Various implementations can adjust the selected patches in response to the repositioning. Additionally, implementations can detect spinal column changes in the shape, size, position, and orientation caused by positioning the patient or operating an instrument during the surgical procedure. Detecting these changes relative to the static pre-operative images can be advantageous, especially when the detection allows for real-time feedback to the operating surgeon during the surgical procedure. In this example of a template, past historical data may include templates used successfully in past matches (for example, when applied to the same vertebrae and with comparable insonification angles). Simulations based on the pre-operative image volume and the vertebral anatomy may also assist the determination of the template. In various implementations, the selected patches may update the template of patches (804). The feedback can enhance the deep learning process. The implementations may activate a parallel pruning process to remove areas that are less likely to generate matches of decent quality (806). The pruning process may also be based on templates of patches from the anatomy where matches are unlikely and unpromising (803). Templates 803 may also include a library of patches determined based on past historical data as well as the specific insonification angles during the intra-operative procedure. For example, the pruning can be adjusted in response to a repositioning of the ultrasound probe. Templates 803 may also be updated based on the pruning process (807). The update can likewise enhance the deep learning process. The combined action of selecting patches (805) and pruning patches (806) may generate the output regions of interests (ROIs) for computing an alignment of the intra-operative ultrasound surface representation with the pre-operative surface representation (808).

Figure 8C:
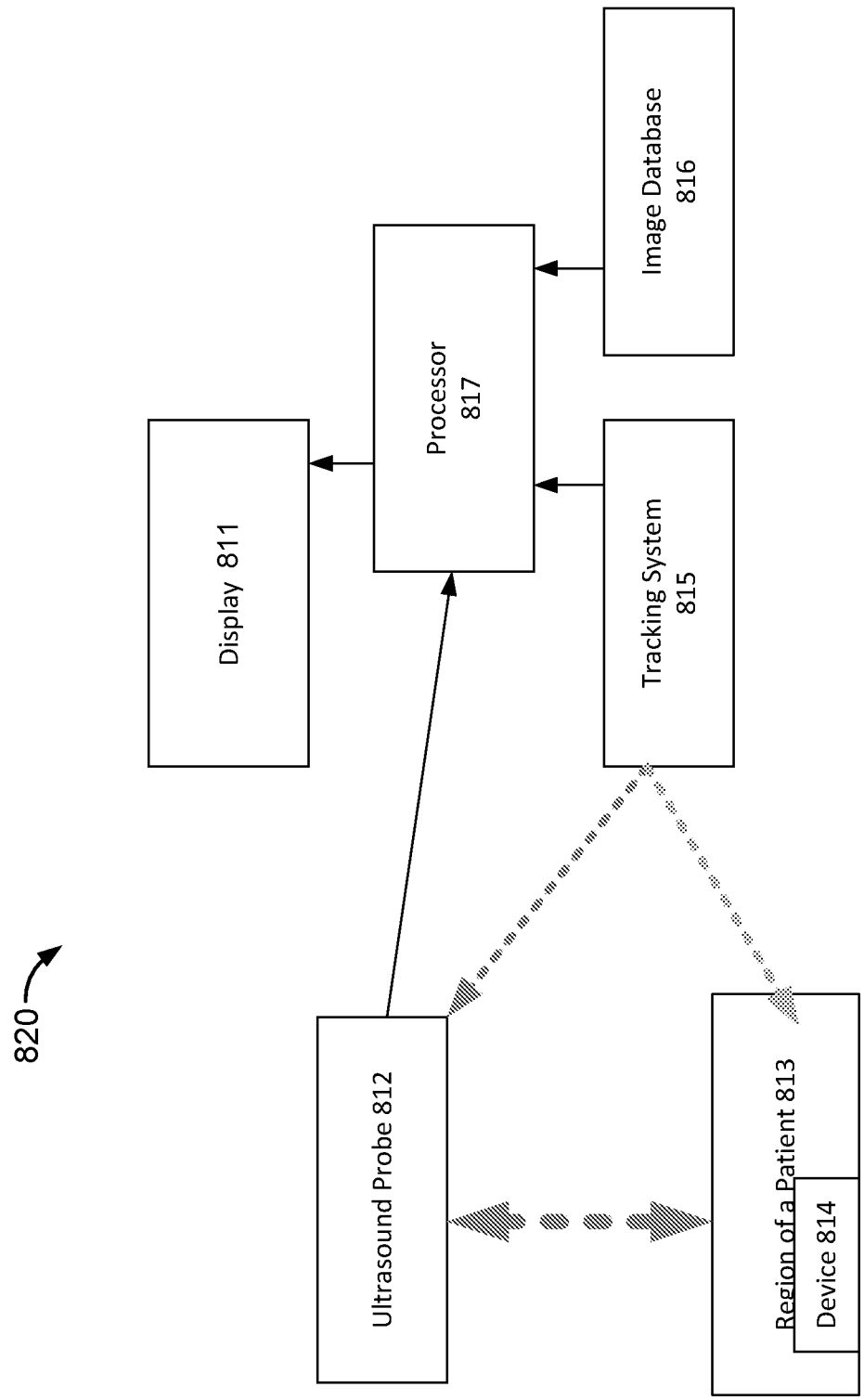

Further referring to FIG. 8C, diagram 820 shows an example of a navigation system according to some implementations of the present disclosure. During a surgical procedure, an ultrasound probe 812, operated by an operating surgeon, can monitor a region of the patient 813. The region can include a spinal column region, a pelvic region, a sacral region, or an occipital region. In one illustration, an implant or a stimulator device may be implanted during the surgical procedure. Here, the implant may refer to a passive device such as a prosthetic implant or a hip implant. A surgical instrument used by the operating surgeon can facilitate placing a device such as a pedicle screw in the region of the patient. As illustrated, device 814 is inside the region of the patient. The surgeon may operate the ultrasound probe to monitor the placement of the device during the surgical procedure. The real-time data from the ultrasound probe during the surgical procedure can be fused with static pre-operative images. When the fused images are presented to the operating surgeon in real-time during the surgical procedure, the static pre-operative images are brought back to life. The ultrasound data can confirm or track bone displacement against a pre-surgical plan, such as changes in lumbar lordosis. The ultrasound data can also track an instrument, a device (e.g., tip of a needle device) during the surgical procedure. When the ultrasound data is merged with As illustrated, the navigation system can include a separate tracking system 815 capable of tracking the position of ultrasound probe 812 as well as device 814 inside the region of the patient. The tracking system can include at least one of: an optical tracker, a stepped motor, an electromagnetic sensor, an accelerator, or a gyroscope. The tracking system can perform opto-electronic tracking based on the position data of the ultrasound probe and the location information of a vertebra so that real-time guidance information can be provided to the operating surgeon to adjust the position of the ultrasound probe. In some cases, the ultrasound probe may be mounted on a robotic arm, which can automatically adjust the position of the ultrasound probe 812.

Diagram 820 also includes image database 816, which stores pre-operative images of the region of the patient. As described earlier, the pre-operative images can include CT images or MRI images. The MRI images can include zero TE MRI images. As illustrated, tracking information from tracking system 815, intra-operative ultrasound data from ultrasound probe 812, and pre-operative non-ultrasound images from image database 816 can be provided to computer processor 817. As described above in association with FIGS. 1-8B, the implementations can develop and establish a template of ROIs for aligning the intra-operative US data with the pre-operative images. The template of ROIs can vary, depending on the underlying bone structure (or device interface), and the position of the ultrasound probe. Based on a specific template of ROIs, images based on the intra-operative ultrasound data can be fused with the pre-operative non-ultrasound images to provide a real-time navigation guidance to the operating surgeon during the surgical procedure. In some cases, the fused images can be presented on display 811. In some cases, the fused images can be projected on a platform for mixed-reality, augmented reality, or virtual reality.

The navigation system can combine the strengths of multiple radiological imaging modalities to achieve accurate and interactive guidance in the operating room. Some implementations can accurately co-register, in real-time, navigated insonified data of the posterior osseous surface of the spine to pre-operatively acquired CT or MRI reference data of the posterior osseous surface of the spine. The implementations are also capable of co-registering images from regions other than the spinal column region, such as the pelvic region, the sacral region, or the occipital region. Building on the co-registered data, the implementations can provide intraoperative guidance during spinal surgery, for example, by projecting fused images in real-time to the operating surgeon in the operating room.

Figure 9:
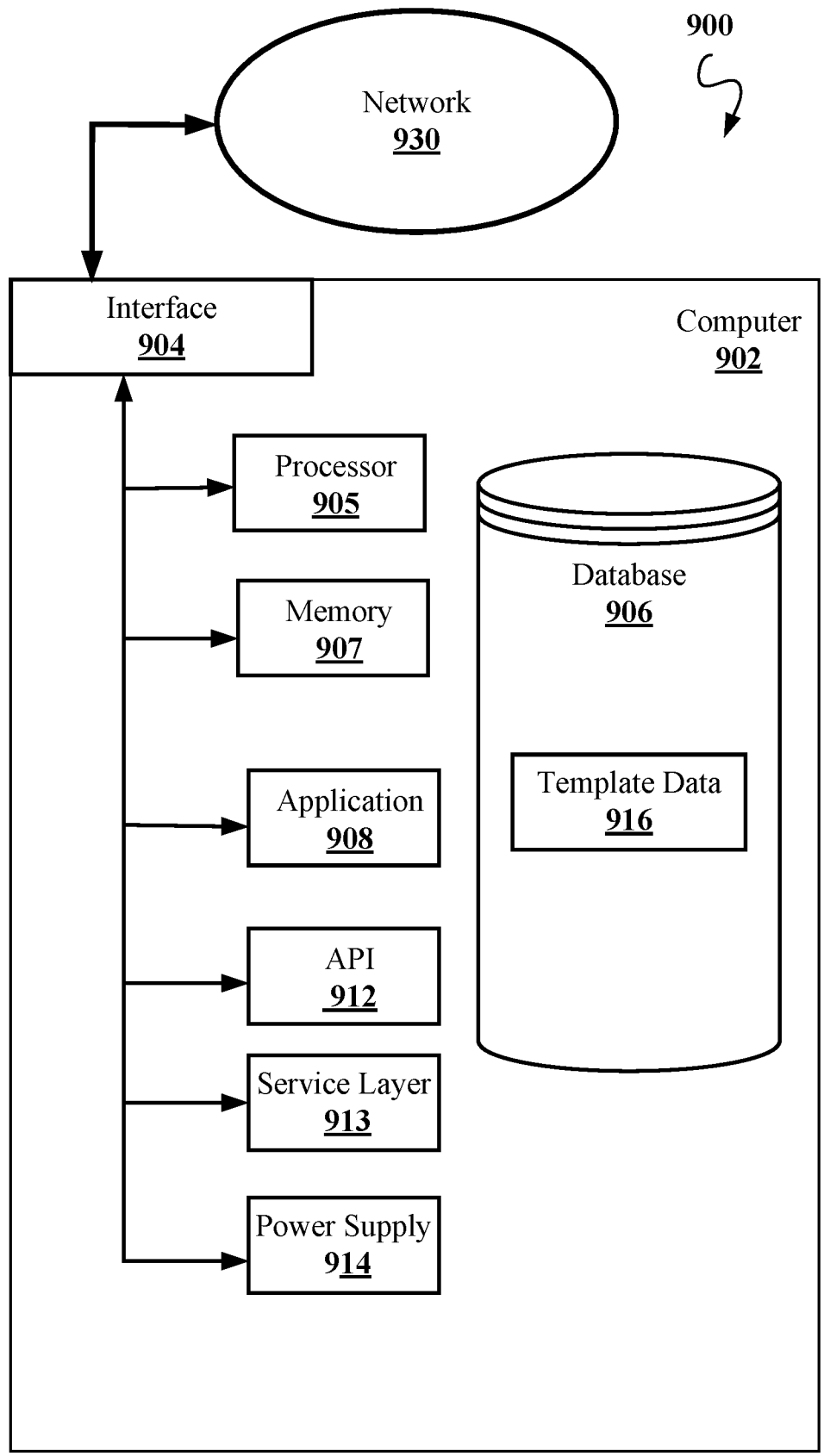
FIG. 9 is a block diagram illustrating an example of a computer system used to provide computational functionalities associated with described algorithms, methods, functions, processes, flows, and procedures, according to an implementation of the present disclosure.

FIG. 9 is a block diagram illustrating an example of a computer system used to provide computational functionalities associated with described algorithms, methods, functions, processes, flows, and procedures, according to an implementation of the present disclosure.

The illustrated computer 902 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 902 can comprise a computer that includes an input device, such as a keypad, keyboard, touch screen, another input device, or a combination of input devices that can accept user information, and an output device that conveys information associated with the operation of the computer 902, including digital data, visual, audio, another type of information, or a combination of types of information, on a graphical-type user interface (UI) (or GUI) or other UI.

The computer 902 can serve in a role in a computer system as a client, network component, a server, a database or another persistency, another role, or a combination of roles for performing the subject matter described in the present disclosure. The illustrated computer 902 is communicably coupled with a network 903. In some implementations, one or more components of the computer 902 can be configured to operate within an environment, including cloud-computing-based, local, global, another environment, or a combination of environments.

The computer 902 is an electronic computing device operable to receive, transmit, process, store, or manage data and information associated with the described subject matter. According to some implementations, the computer 902 can also include or be communicably coupled with a server, including an application server, e-mail server, web server, caching server, streaming data server, another server, or a combination of servers.

The computer 902 can receive requests over network 903 (for example, from a client software application executing on another computer 902) and respond to the received requests by processing the received requests using a software application or a combination of software applications. In addition, requests can also be sent to the computer 902 from internal users, external or third-parties, or other entities, individuals, systems, or computers.

Each of the components of the computer 902 can communicate using a system bus 903. In some implementations, any or all of the components of the computer 902, including hardware, software, or a combination of hardware and software, can interface over the system bus 903 using an application programming interface (API) 912, a service layer 913, or a combination of the API 912 and service layer 913. The API 912 can include specifications for routines, data structures, and object classes. The API 912 can be either computer-language independent or dependent and refer to a complete interface, a single function, or even a set of APIs. The service layer 913 provides software services to the computer 902 or other components (whether illustrated or not) that are communicably coupled to the computer 902. The functionality of the computer 902 can be accessible for all service consumers using this service layer. Software services, such as those provided by the service layer 913, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 902, alternative implementations can illustrate the API 912 or the service layer 913 as stand-alone components in relation to other components of the computer 902 or other components (whether illustrated or not) that are communicably coupled to the computer 902. Moreover, any or all parts of the API 912 or the service layer 913 can be implemented as a child or a sub-module of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902. The interface 904 is used by the computer 902 for communicating with another computing system (whether illustrated or not) that is communicatively linked to the network 903 in a distributed environment. Generally, the interface 904 is operable to communicate with the network 903 and comprises logic encoded in software, hardware, or a combination of software and hardware. More specifically, the interface 904 can comprise software supporting one or more communication protocols associated with communications such that the network 903 or interface's hardware is operable to communicate physical signals within and outside of the illustrated computer 902.

The computer 902 includes a processor 905. Although illustrated as a single processor 905 in FIG. 9, two or more processors can be used according to particular needs, desires, or particular implementations of the computer 902. Generally, the processor 905 executes instructions and manipulates data to perform the operations of the computer 902 and any algorithms, methods, functions, processes, flows, and procedures as described in the present disclosure.

The computer 902 also includes a database 906 that can hold data for the computer 902, another component in communication with the network 903 (whether illustrated or not), or a combination of the computer 902 and another component. For example, database 906 can be an in-memory, conventional, or another type of database storing data consistent with the present disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases of similar or differing types can be used according to particular needs, desires, or particular implementations of the computer 902 and the described functionality. While database 906 is illustrated as an integral component of the computer 902, in alternative implementations, database 906 can be external to the computer 902. As illustrated, the database 906 holds the previously described data 916 including, for example, pre-operative image volume (including CT and MRI data set), intra-operative data volume (including, for example, raw I/Q data from the ultrasound probe), templates of patches where matches are more likely and promising, and templates of matches where matches are more unlikely and unpromising, as outlined in FIGS. 1 and 8B.

The computer 902 also includes a memory 907 that can hold data for the computer 902, another component or components communicatively linked to the network 903 (whether illustrated or not), or a combination of the computer 902 and another component. Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 or similar or differing types can be used according to particular needs, desires, or particular implementations of the computer 902 and the described functionality. While memory 907 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in the present disclosure. For example, application 908 can serve as one or more components, modules, or applications. Further, although illustrated as a single application 908, the application 908 can be implemented as multiple applications 908 on the computer 902. In addition, although illustrated as integral to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion or management circuits (including recharging, standby, or another power management functionality). In some implementations, the power-supply 914 can include a power plug to allow the computer 902 to be plugged into a wall socket or another power source to, for example, power the computer 902 or recharge a rechargeable battery.

There can be any number of computers 902 associated with, or external to, a computer system containing computer 902, each computer 902 communicating over network 903. Further, the term "client," "user," or other appropriate terminology can be used interchangeably, as appropriate, without departing from the scope of the present disclosure. Moreover, the present disclosure contemplates that many users can use one computer 902, or that one user can use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with the described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/- R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

As used herein, the terms "comprises" and "comprising" are to be construed as being inclusive and open-ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. Indeed, other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
accessing, ultrasound data obtained from intra-operatively insonifying a region of a patient using an ultrasound probe during a surgical procedure wherein the ultrasound data encode, in real-time, 3D surface information of one or more bone structures in the region as well as locational information of the one or more bone structures relative to the ultrasound probe;
extracting a first 3D surface representation of the one or more bone structures based on the ultrasound data;
accessing non-ultrasound imaging data obtained from performing non-ultrasound imaging of the region of the patient prior to the surgical procedure, the non-ultrasound imaging data including 3D surface anatomical information of the one or more bone structures in the region;
extracting a second 3D surface representation of the one or more bone structures based on the non-ultrasound imaging data;
identifying, using a deep learning algorithm, one or more regions of interest (ROI)s from the first 3D surface representation which correspond to patches on the first 3D surface representation with sufficient ultrasound signal quality for aligning with the second 3D surface;
based on the one or more ROIs, determining a spatial transformation for aligning the first 3D surface representation and the second 3D surface representation; and
based on applying the spatial transformation, generating an overlay of the 3D surface anatomical information from the non-ultrasound imaging data on the 3D surface information from the ultrasound data.

2. The computer-implemented method of claim 1, wherein identifying the one or more ROIs comprises:
growing the identified one or more ROIs by adding an area from the first 3D surface representation where the first 3D surface representation and the second 3D surface representation are matched above a first threshold level.

3. The computer-implemented method of claim 1, wherein identifying the one or more ROIs comprises:
pruning the identified one or more ROIs by subtracting an area from the first 3D surface representation where the first 3D surface representation and the second 3D surface representation are above a first threshold level.

4. The computer-implemented method of claim 1, wherein identifying the one or more ROIs comprises:
training the deep learning algorithm to iteratively improve the spatial transformation such that the spatial transformation is achieved within a pre-determined time interval for the 3D surface anatomical information from the ultrasound data to be overlaid on the non-ultrasound data in real-time during the surgical procedure.

5. The computer-implemented method of claim 4, wherein the deep learning algorithm comprises:
adjusting a number of the one or more ROIs, a size of the one or more ROIs, a location of the one or more ROIs, a first threshold level for determining a match between the first and second 3D surface representations, and a second threshold level for determining a noise characteristic of the first and second 3D surface representations.

6. The computer-implemented method of claim 4, wherein the deep learning algorithm comprises:

storing first templates of patches where the first 3D surface representation and the second 3D surface representation tend to match.

7. The computer-implemented method of claim 6, wherein the deep learning algorithm comprises:
based on the spatial transformation for at least one of the ultrasound data or the non-ultrasound imaging data, revising the first templates of ROIs where the first surface 3D representation and the second surface 3D representation tend to match.

8. The computer-implemented method of claim 4, wherein the deep learning algorithm comprises:
storing second templates of patches where the first 3D surface representation and the second surface representation tend to mismatch.

9. The computer-implemented method of claim 8, wherein the deep learning algorithm comprises:
based on the spatial transformation for at least one of the ultrasound data or the non-ultrasound imaging data, revising the second templates of ROIs where the first 3D surface representation and the second 3D surface representation tend to mismatch.

10. The computer-implemented method of claim 1, further comprising:
based on aligning the first 3D surface representation and the second 3D surface representation over the one or more ROIs, tracking a displacement of the one or more bone structures in the region between the non-ultrasound imaging data obtained prior to the surgical procedure and the ultrasound data obtained during the surgical procedure; and
based on the spatial transformation, quantifying the displacement of the one or more bone structures in the region between the non-ultrasound imaging data obtained prior to the surgical procedure and the ultrasound data obtained during the surgical procedure.

11. The computer-implemented method of claim 10, further comprising:
based on the tracked displacement, updating, in real-time, a navigational guidance to an operating surgeon during the surgical procedure such that a position of the ultrasound probe can be adjusted.

12. The computer-implemented method of claim 11, further comprising:
in response to the ultrasound probe being repositioned to insonify the one or more bone structure during the surgical procedure, refreshing the spatial transformation such that the overlay of the 3D surface anatomical information from the non-ultrasound imaging data on the 3D surface anatomical information from the ultrasound data is updated, wherein the ultrasound data is obtained from the repositioned ultrasound probe.

13. The computer-implemented method of claim 1, further comprising:
tracking, using the ultrasound data, a location of a device during the surgical procedure, wherein the device comprises: a surgical instrument, an implant, or a stimulator device; and
projecting the tracked location of the device on the overlay where the 3D surface information of the one or more bone structures from the non-ultrasound imaging data is overlaid on the 3D surface information of the one or more bone structures from the ultrasound data.

14. The computer-implemented method of claim 1, wherein extracting the first 3D surface representation comprises:

determining a tissue-bone interface based on applying a method that comprises a forward tracing method, or a back shadow method, wherein the method is performed along an ultrasound propagation direction to determine the tissue-bone interface, and wherein the method is performed without encountering reverberations from the tissue-bone interface.

15. The computer-implemented method of claim 1, wherein the non-ultrasound imaging data comprises: a computed tomography (CT) image, or a magnetic resonance imaging (MRI) image, wherein the MRI image comprises: a zero echo-time (TE) MRI image, and wherein the computer-implemented method is performed without accessing X-ray fluoroscopy data.

16. The computer-implemented method of claim 1, wherein the region includes a spinal column region, a pelvic region, a sacral region or an occipital region.

17. The computer-implemented method of claim 1, wherein the region includes at least one of humeri, elbows, radius, ulna, metacarpals, phalanges, scapula, ribs, iliac wings, femurs, patella, tibias, fibulas, or metatarsal.

18. The computer-implemented method of claim 1, wherein the region includes at least one of shoulders, elbows, wrists, hands, hips, knees, ankles or feet.

19. The computer-implemented method of claim 1, wherein the region includes an area for biopsy of one or more lesions within a bone, around the bone, and on the surface of the bone.

20. The computer-implemented method of claim 1, wherein the region includes one or more areas for a soft tissue or trigger point injection, and for injecting into (i) a joint for arthrocentesis, facet joint block, or arthrography, (ii) bursa or ganglia around one or more bones of at least one extremity, (iii) one or more ligamentous structures around the joint, (iv) one or more structural tunnels that include carpal and tarsal tunnels in the patient's hands or feet, or (v) one or more tendons.

21. The method of claim 1 wherein the region is a joint.

22. The method of claim 1, wherein the ultrasound data comprise at least one of: raw in-phase/quadrature data, or raw radio frequency (RF) data.

23. A system comprising:
an ultrasound probe operable to insonify a region of a patient;
a display device capable of providing real-time visual feedback during a surgical procedure; and
a computer processor in communication with the ultrasound probe and the display device, the computer processor configured to:
access ultrasound data obtained from intra-operatively insonifying the region of the patient during the surgical procedure, wherein the ultrasound data encode, in real-time, 3D surface information of one or more bone structures in the region as well as locational information of the one or more bone structures relative to the ultrasound probe;
extract a first 3D surface representation of the one or more bone structures based on the ultrasound data;
access non-ultrasound imaging data obtained from performing non-ultrasound imaging on the region of the patient prior to the surgical procedure, the non-ultrasound imaging data including 3D surface anatomical information of the one or more bone structures in the region;
extract a second 3D surface representation of the one or more bone structures based on the non-ultrasound imaging data;
identify, using a deep learning algorithm, one or more regions of interest (ROI) s from the first 3D surface representation which correspond to patches on the first 3D surface representation with sufficient ultrasound signal quality for aligning with the second 3D surface;
based on the one or more ROIs, determining a spatial transformation for aligning the first 3D surface representation and the second 3D surface representation; and
based on applying the spatial transformation, generate an overlay of the 3D surface anatomical information from the non-ultrasound imaging data on the 3D surface information from the ultrasound data.

24. The system of claim 23, wherein the computer processor is further configured to:
track, using the ultrasound data, a location of a surgical instrument during the surgical procedure; and
project the tracked location of the surgical instrument on the overlay where the 3D surface information of the one or more bone structures from the non-ultrasound imaging data is overlaid on the 3D surface information of the one or more bone structures from the ultrasound data, wherein the surgical instrument is operable to facilitate placing a pedicle screw, an implant, or a stimulator, in the region during the surgical procedure.

25. The system of claim 23, wherein the computer processor is further configured to:
based on aligning the first 3D surface representation and the second 3D surface representation over the one or more ROIs, track a displacement of the one or more bone structures in the region between the non-ultrasound imaging data obtained prior to the surgical procedure and the ultrasound data obtained during the surgical procedure; and
based on the tracked displacement, update, in real-time, a navigational guidance to an operating surgeon during the surgical procedure such that a position of the ultrasound probe can be adjusted.

26. The system of claim 23, wherein the display device is configured to refresh, in real-time, the overlay of the 3D surface anatomical information from the non-ultrasound imaging data on the 3D surface information from the ultrasound data such that an augmented reality rendering is provided to navigate an operating surgeon during the surgical procedure.

27. The system of claim 26, wherein the display device comprises a wearable device, and wherein the ultrasound probe comprises a wireless ultrasound probe.

28. The system of claim 23, further comprising:
a tracking system coupled to the computer processor and configured to provide real-time tracking information of the ultrasound probe during the surgical procedure, wherein the real-time tracking information of the ultrasound probe, when combined with locational information of the one or more bone structures relative to the ultrasound probe, is translatable to a navigational guidance to an operating surgeon with respect to positioning the ultrasound probe during the surgical procedure.

29. The system of claim 28, wherein the tracking system comprises at least one of: an optical tracker, a stepped motor, an electromagnetic sensor, an accelerator, or a gyroscope.

30. The system of claim 23 wherein the region includes a spinal column region, a pelvic region, a sacral region or an occipital region.

31. The system of claim 23, wherein the region includes at least one of humeri, elbows, radius, ulna, metacarpals, phalanges, scapula, ribs, iliac wings, femurs, patella, tibias, fibulas, or metatarsal.

32. The system of claim 23, wherein the region includes at least one of shoulders, elbows, wrists, hands, hips, knees, ankles or feet.

33. The system of claim 23, wherein the region includes one or more areas for biopsy of one or more lesions within a bone, around the bone, and on the surface of the bone.

34. The system of claim 23, wherein the region includes one or more areas for a soft tissue or trigger point injection, and for injecting into (i) a joint for arthrocentesis, facet joint block, or arthrography, (ii) bursa or ganglia around one or more bones of at least one extremity, (iii) one or more ligamentous structures around the joint, (iv) one or more structural tunnels that include carpal and tarsal tunnels in the patient's hands or feet, or (v) one or more tendons.

35. A computer-implemented method, comprising:
accessing, ultrasound data obtained from insonifying a region of a patient using an ultrasound probe wherein the ultrasound data encode, in real-time, 3D surface information of one or more bone structures in the region as well as locational information of the one or more bone structures relative to the ultrasound probe;
extracting a first 3D surface representation of the one or more bone structures based on the ultrasound data;
accessing non-ultrasound imaging data obtained from performing non-ultrasound imaging of the region of the patient, the non-ultrasound imaging data including 3D surface anatomical information of the one or more bone structures in the region;
extracting a second 3D surface representation of the one or more bone structures based on the non-ultrasound imaging data;
identifying, using a deep learning algorithm, one or more regions of interest (ROI)s from the first 3D surface representation which correspond to patches on the first 3D surface representation with sufficient ultrasound signal quality for aligning with the second 3D surface;
based on the one or more ROIs, determining a spatial transformation for aligning the first 3D surface representation and the second 3D surface representation; and
based on applying the spatial transformation, generating an overlay of the 3D surface anatomical information from the non-ultrasound imaging data on the 3D surface information from the ultrasound data.

* * * * *